(12) United States Patent
Powers et al.

(10) Patent No.: US 12,152,677 B2
(45) Date of Patent: Nov. 26, 2024

(54) SYSTEM AND METHOD FOR OPTIMIZING A FLUID ENVIRONMENT IN SPLIT MECHANICAL SEALS

(71) Applicant: A.W. Chesterton Company, Groveland, MA (US)

(72) Inventors: Robert James Powers, Salem, MA (US); Henri Vincent Azibert, Windham, NH (US)

(73) Assignee: A.W. CHESTERTON COMPANY, Groveland, MA (US)

( * ) Notice: Subject to any disclaimer, the term of this patent is extended or adjusted under 35 U.S.C. 154(b) by 123 days.

(21) Appl. No.: 18/111,840

(22) Filed: Feb. 20, 2023

(65) Prior Publication Data

US 2023/0204107 A1 Jun. 29, 2023

Related U.S. Application Data

(63) Continuation-in-part of application No. 17/339,397, filed on Jun. 4, 2021, now Pat. No. 11,608,898.

(60) Provisional application No. 63/311,724, filed on Feb. 18, 2022, provisional application No. 63/035,504, filed on Jun. 5, 2020.

(51) Int. Cl.
*F16J 15/34* (2006.01)
*F16J 15/40* (2006.01)

(52) U.S. Cl.
CPC .......... *F16J 15/3488* (2013.01); *F16J 15/40* (2013.01)

(58) Field of Classification Search
CPC ............................ F16J 15/3488; F16J 15/40
See application file for complete search history.

(56) References Cited

U.S. PATENT DOCUMENTS

| | | | |
|---|---|---|---|
| 1,544,609 | A | 7/1925 | Somes |
| 2,258,190 | A | 10/1941 | Neilon |
| 2,834,616 | A | 5/1958 | Gebert et al. |
| 3,071,385 | A | 1/1963 | Greiner |
| 3,124,502 | A | 3/1964 | Radke |
| 3,524,654 | A | 8/1970 | Hasselbacher |
| 4,364,571 | A | 12/1982 | Hershey |
| 4,410,188 | A | 10/1983 | Copes |
| 4,575,098 | A | 3/1986 | Escue |
| 4,576,384 | A | 3/1986 | Azibert |
| 4,580,793 | A | 4/1986 | Bronson |

(Continued)

FOREIGN PATENT DOCUMENTS

| | | |
|---|---|---|
| CN | 101490450 A | 7/2009 |
| CN | 102506177 A | 6/2012 |

(Continued)

OTHER PUBLICATIONS

Arabidopsis thaliana phytosulfokin receptor 1 (PSKR1), mRNA GenBank: NM_126282.3, Feb. 14, 2019 (Feb. 14, 2019), 4 pages.

(Continued)

*Primary Examiner* — Vishal A Patel
(74) *Attorney, Agent, or Firm* — Nelson Mullins Riley & Scarborough LLP; Anthony A. Laurentano

(57) ABSTRACT

A mechanical seal assembly includes a gland assembly having a chamber formed in an inner surface for seating a fluid insert element. The fluid insert element promotes movement of particles present in a slurry process fluid away from a seal interface formed by the sealing surfaces of rotary and stationary seal rings.

17 Claims, 18 Drawing Sheets

(56) References Cited

U.S. PATENT DOCUMENTS

| | | |
|---|---|---|
| 4,666,001 A | 5/1987 | Burr |
| 4,669,739 A | 6/1987 | Riccitelli |
| 4,682,913 A | 7/1987 | Shatto et al. |
| 4,721,311 A * | 1/1988 | Kakabaker ............ F16J 15/162 277/408 |
| 4,836,694 A | 6/1989 | Schmehr et al. |
| 4,928,371 A | 5/1990 | Colanzi et al. |
| 5,039,113 A | 8/1991 | Gardner |
| 5,114,163 A | 5/1992 | Radosav et al. |
| 5,192,083 A | 3/1993 | Jones, Jr. et al. |
| 5,195,867 A * | 3/1993 | Stirling ................ F16J 15/3404 415/111 |
| 5,199,720 A | 4/1993 | Radosav et al. |
| 5,203,575 A * | 4/1993 | Azibert ................ F16J 15/3448 277/408 |
| 5,370,401 A | 12/1994 | Sandgren |
| 5,490,021 A | 2/1996 | Muller et al. |
| 5,553,868 A * | 9/1996 | Dunford ............ F04D 29/106 277/358 |
| 5,571,268 A | 11/1996 | Azibert |
| 5,630,699 A * | 5/1997 | Kirby ................. F16J 15/3484 415/230 |
| 5,711,532 A | 1/1998 | Clark et al. |
| 5,716,054 A | 2/1998 | Duffee et al. |
| 5,730,447 A | 3/1998 | Dawson et al. |
| 5,820,129 A | 10/1998 | Reagan |
| 5,961,122 A | 10/1999 | Marsi |
| 6,007,069 A | 12/1999 | Sadowski |
| 6,059,293 A | 5/2000 | Azibert et al. |
| 6,076,832 A | 6/2000 | Pow |
| 6,350,060 B1 | 2/2002 | Peterson |
| 6,457,720 B1 | 10/2002 | London |
| 6,485,023 B2 | 11/2002 | Budrow et al. |
| 6,485,024 B1 | 11/2002 | Pippert et al. |
| 6,814,355 B2 | 11/2004 | Bjornson |
| 6,918,593 B2 | 7/2005 | Takahashi |
| 7,121,551 B2 * | 10/2006 | Dunford .............. F16J 15/3404 277/411 |
| 7,708,283 B2 | 5/2010 | Azibert et al. |
| 7,887,061 B2 | 2/2011 | Van Dyke et al. |
| 8,091,897 B2 | 1/2012 | Giard |
| 9,546,734 B2 | 1/2017 | Cid et al. |
| 10,352,457 B2 | 7/2019 | Cid |
| 10,605,255 B2 * | 3/2020 | Kung .................. F16J 15/3484 |
| 11,608,898 B2 | 3/2023 | Azibert et al. |
| 2002/0101038 A1 | 8/2002 | Budrow et al. |
| 2004/0150166 A1 | 8/2004 | Takahashi |
| 2005/0087931 A1 | 4/2005 | Yamauchi et al. |
| 2007/0267818 A1 | 11/2007 | Giard |
| 2008/0246178 A1 | 10/2008 | Hashimoto |
| 2009/0019743 A1 | 1/2009 | Nguyen |
| 2011/0221136 A1 | 9/2011 | Dudek |
| 2014/0159316 A1 | 6/2014 | Cid et al. |
| 2021/0381603 A1 | 12/2021 | Azibert et al. |

FOREIGN PATENT DOCUMENTS

| | | |
|---|---|---|
| CN | 109058466 A | 12/2018 |
| CN | 110081176 A | 8/2019 |
| DE | 38 04 183 A1 | 8/1989 |
| EP | 0438346 A1 | 7/1991 |
| EP | 0658713 A1 | 6/1995 |
| GB | 2143911 B | 7/1986 |
| JP | S60-40870 U | 3/1985 |
| WO | 97/04256 A1 | 2/1997 |
| WO | 2004035798 A2 | 4/2004 |
| WO | 2007/136453 A2 | 11/2007 |
| WO | 2012/001829 A1 | 1/2012 |
| WO | 2012017067 A1 | 2/2012 |

OTHER PUBLICATIONS

Rodiuc, N. et al. "Evolutionarily distant pathogens require the Arabidopsis phytosulfokine signalling pathway to establish disease" Plant Cell Environ, vol. 39, No. 7, Jul. 31, 2016 (Jul. 31, 2016).

Loivamaki, M. et al. "A role for PSK signaling in wounding and microbial interactions in Arabidopsis" Physiologia Plantarum, vol. 139 (4) (2021).

* cited by examiner

SYSTEM AND METHOD FOR OPTIMIZING A FLUID ENVIRONMENT IN SPLIT MECHANICAL SEALS

RELATED APPLICATION

The present application claims priority to U.S. provisional patent application Ser. No. 63/311,724, filed on Feb. 18, 2022, and entitled System And Method For Optimizing Fluid Environment In Mechanical Seals, and is a continuation-in-part patent application of U.S. patent application Ser. No. 17/339,397, filed on Jun. 4, 2021, and entitled Externally Energized Secondary Seals In Split Mechanical Seals, which claims priority to U.S. provisional patent application Ser. No. 63/035,504, filed on Jun. 5, 2020, and entitled Externally Energized Secondary Seals In Split Mechanical Seals. The contents of the foregoing patent applications are herein incorporated by reference.

BACKGROUND OF THE INVENTION

Conventional mechanical seals are employed in a wide variety of environments and settings, such as for example, in mechanical apparatuses, to provide a fluid-tight seal. The mechanical seals are usually positioned about a rotating shaft or rod that is mounted in and protrudes from a stationary mechanical housing.

Split mechanical seals are employed in a wide variety of mechanical apparatuses to provide a pressure-tight and fluid-tight seal. The mechanical seal is usually positioned about a rotating shaft that is mounted in and protruding from stationary equipment. The mechanical seal is usually bolted to the stationary equipment at the shaft exit, thus preventing the loss of pressurized process fluid from the stationary equipment. Conventional split mechanical seals include face-type mechanical seals, which include a pair of seal rings that are concentrically disposed about the shaft and are axially spaced from each other. The seal rings each have sealing faces that are biased into sealing contact with each other. Usually, one seal ring remains stationary while the other seal ring is coupled to the shaft and rotates therewith. The mechanical seal prevents leakage of the pressurized process fluid to the external environment by biasing the seal ring sealing faces into sealing contact with each other. The rotary seal ring is usually mounted in a holder assembly which is disposed in a chamber formed by a gland assembly. The holder assembly can have a pair of holder halves or segments secured together by a screw. Likewise, the gland assembly can have a pair of gland halves or segments that are also secured together by a screw. The seal rings are also often divided into segments, each segment having a pair of sealing faces, thereby resulting in each ring being a split ring that can be mounted about the shaft without the necessity of freeing one end of the shaft.

Prior art split mechanical seals have rotary and stationary components assembled around the shaft and then bolted on to the equipment to be sealed. A rotary seal face is inserted into a rotary metal clamp after the segments are assembled around the shaft. Then, the stationary face segments and gland segments are assembled and the split gland assembly is then bolted to the pump housing. Alternatively, the stationary and rotary sealing components can be preassembled into subassemblies that can then be mounted about the shaft.

Split mechanical seals that come in rotary and stationary halve assemblies (e.g., four sub-assemblies) have the split surfaces of the metal parts, the elastomer gaskets and O-rings, and the primary faces all in line. This significantly increases the difficulty in assuring that all the components are constrained to come back into sealing alignment. For example, as the O-rings are compressed radially inside their grooves, they expand circumferentially with ends protruding, potentially buckling when joined, thereby causing pinching by metal or seal face parts at the location of the split. The conventional method of staggering the splits of the various parts within the rotating or stationary assemblies cannot be utilized as whole sub-assemblies are secured around the shaft and not individual components. This facilitates and speeds up the seal assembly onto the equipment but can result in parts misalignment and subsequent measurable leakage from the joints formed by the sealing components.

Conventional split mechanical seal designs posed several problems for users of the seals. For example, the split mechanical seals often times did not adequately circulate or remove contaminates that reside in slurry like process fluids. The contaminants, if left in place near the split seal faces, can adversely affect the sealing performance of the mechanical seal and degrade the operation and function of the mechanical seal over time.

SUMMARY OF THE INVENTION

The present invention is directed to a mechanical seal assembly that includes a gland assembly having a chamber formed in an inner surface for seating a fluid insert element. The fluid insert element promotes movement of particles present in a slurry process fluid away from a seal interface formed by the sealing surfaces of rotary and stationary seal rings.

The mechanical seal assembly of the present invention includes a gland assembly having a main body that includes an outer surface and an inner surface, where the inner surface has at least one gland chamber formed therein. A fluid insert element is provides and is sized and configured for mounting in the gland chamber. The fluid insert element has a main body having a non-planar bottom surface configured for being exposed to the slurry process fluid in the gland mounting region. The mechanical seal assembly also includes a holder assembly forming a holder chamber and disposed within the gland mounting region, a rotary seal ring disposed within the holder chamber of the holder assembly and having a main body having a rotor sealing surface formed at one end, and a stationary seal ring disposed within the gland mounting region and having a main body having a stator sealing surface formed at one end. The stator sealing surface and the rotor sealing surface are disposed adjacent to each other to form a sealing interface. The stator sealing surface and the rotor sealing surface have the same size and shape.

The main body of the gland assembly has a first annular portion having a first fluid port formed therein that extends between the inner surface and the outer surface of the gland assembly. The first fluid port is positioned so as to be in fluid communication with the gland chamber. The main body of the gland assembly can also include a second annular portion having a second fluid port formed therein that extends between the inner surface and the outer surface of the gland assembly for introducing a fluid into the gland mounting region. The first annular portion can also include an optional third fluid port that is formed therein and that extends between the inner surface and the outer surface of the gland assembly. The third fluid port is positioned so as to be in fluid communication with the gland chamber.

The bottom surface of the fluid insert element has a curved shape, that can curve in a lateral direction. Alternatively, the curved shape of the bottom surface of the fluid insert element can be curved in a medial direction. According to the present invention, the bottom surface of the fluid insert element can have a sloped surface. Specifically, the bottom surface of the fluid insert element can have a first sloped surface and an opposed second sloped surface that are each sloped at a first angle, and an intermediate sloped surface disposed between the first and second sloped surfaces that is sloped at a second angle, where the second angle is greater than the first angle.

According to one embodiment, the main body of the fluid insert element can include a top surface and a plurality of side walls coupled to the top surface, and a tower portion extending outwardly from the top surface. The tower portion can include a tower top surface and a plurality of tower side walls, where one or more of the plurality of tower side walls has a side wall opening formed therein. The tower top surface can also have a first fluid opening formed therein that is aligned with the first fluid port when the fluid insert element is mounted within the gland chamber. The top surface of the main body of the fluid insert element has a second fluid opening formed therein that is aligned with the first fluid opening.

The mechanical seal assembly of the present invention can also include a stator sealing element disposed about the outer surface of the stationary seal ring; an axially movable spring holder plate having a top surface and an opposed bottom surface and a radially inwardly spaced flange portion, wherein the top surface has a plurality of fastener apertures formed therein; a plurality of biasing clip assemblies configured for mounting about the spring holder plate and for mating engagement with the stationary seal ring for coupling the spring holder plate to the stationary seal ring; and a plurality of fasteners for mounting in the fastener apertures and the gland fastener holes and for securing the spring holder plate to the top surface of the gland assembly. The gland assembly has a top surface having a plurality of gland fastener holes formed therein. The stator sealing element is disposable in a radially uncompressed state when in a first unloaded position and wherein the spring holder plate is movable in the axial direction when the plurality of fasteners are tightened so as to move the stator sealing element in the axial direction into a radially compressed state when in a second loaded position. The top surface of the gland assembly has a plurality of spring holes formed therein and the seal further includes a plurality of springs for mounting in the plurality of spring holes.

The holder assembly can have an inner surface that has a holder detent groove formed therein. The rotary seal ring an also have a rotary detent groove formed in an outer surface thereof. Further, the stationary seal ring has an inner surface having a groove formed therein for coupling to a retaining portion of each of the plurality of biasing clip assemblies. The biasing clip assemblies include an inner spring element and an outer spring element. The inner spring clip includes a main body having an inner ridge portion formed at a first end thereof and configured for engaging with a bottom surface of the spring holder plate, and a bent portion formed at a second opposed end and configured for engaging with the top surface of the stationary seal ring. The outer spring clip has a first coiled end that is sized and configured for seating in the bent portion of the inner spring clip and an opposed second end having a bent tab portion that is sized and configured for engaging with the groove formed in the inner surface of the stationary seal ring.

According to another aspect, the present invention is directed to a split mechanical seal that employs mechanical features that allow the seal to safely operate in mechanical devices that employ a slurry as a process fluid, such as for example in centrifugal pumps. The mechanical features utilize existing fluid motion, such as the rotating motion of fluids around the shaft and associated mechanical seal components, that originates from the boundary layer of the components to induce fluid flow and if desired to move, circulate, capture and expel contaminants present within the process fluid. The mechanical features of the present invention can include mechanical insert components that are installed in selected channels formed at selected locations along an inner surface of a gland assembly that is mounted on the centrifugal pump. Due to the inherent splits or joints present in a split mechanical seal, continuous concentric helical components are undesirable. The mechanical insert components of the present invention can be mounted in or reside in under-utilized segments, locations or arcs of the gland element. For example, an annular cavity or chamber can be formed along an inner surface of the gland that is sized and configured for mounting the mechanical insert component. The configuration of the mechanical insert component can be varied and preferably includes a main body having a sloped or arcuate surface that faces the process fluid. Hence, the configurations can include open volume arrangements to complex geometries that induce fluid-particle movement and influence fluid currents within the mechanical seal assembly. The purpose of the mechanical insert component is to prevent particle impaction and/or to move the particles away from the seal faces of the seal rings. The protection of the mechanical seal interface is important to the operation and longevity of the split mechanical seal, thereby reducing maintenance and increasing the longevity of the mechanical seal.

BRIEF DESCRIPTION OF THE DRAWINGS

These and other features and advantages of the present invention will be more fully understood by reference to the following detailed description in conjunction with the attached drawings in which like reference numerals refer to like elements through the different views. The drawings illustrate principals of the invention and, although not to scale, show relative dimensions.

DETAILED DESCRIPTION

Figure 1:
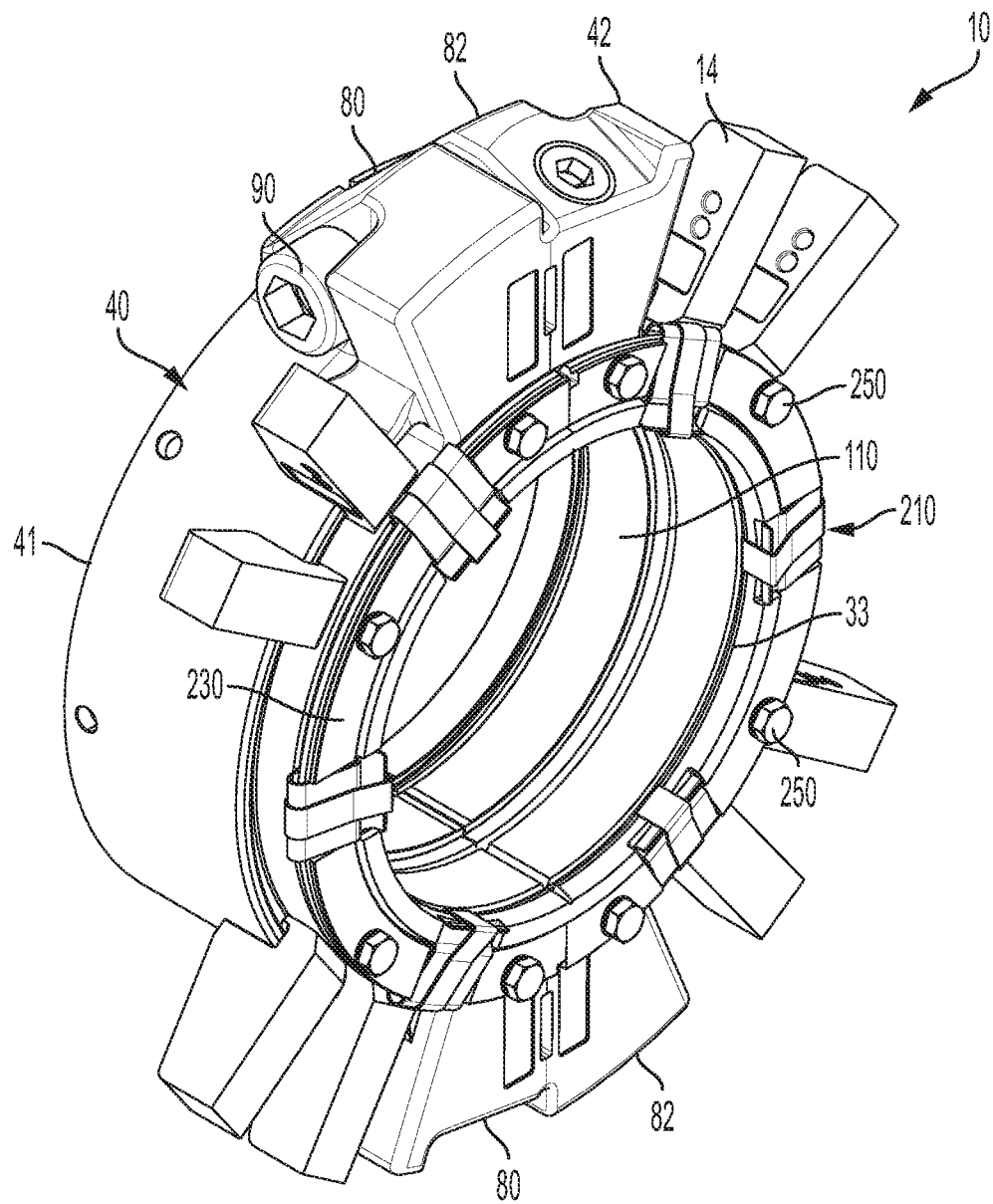
FIG. 1 is a perspective view of the spilt mechanical seal of the present invention.

The present invention provides a mechanical seal assembly employing a gland assembly having a gland chamber formed therein for seating a fluid insert element. The fluid insert element helps impart movement to or adjusts, changes or varies the trajectory of at least a portion of the particulates that are present in a slurry process fluid and which are in the area or vicinity of the seal ring components. The invention will be described below relative to illustrated embodiments. Those skilled in the art will appreciate that the present invention may be implemented in a number of different applications and embodiments and is not specifically limited in its application to the particular embodiment depicted herein.

The terms "mechanical seal assembly" and "mechanical seal" as used herein are intended to include various types of mechanical fluid sealing systems, including single or solid seals, split seals, concentric seals, spiral seals, tandem seals, dual seals, cartridge seals, gas seals, and other known mechanical seal and sealing types and configurations.

The term "shaft" is intended to refer to any suitable device in a mechanical system to which a mechanical seal can be mounted and includes shafts, rods and other known devices. The shafts can move in any selected direction, such as for example in a rotary direction or in a reciprocating direction.

The terms "axial" and "axially" as used herein refer to a direction generally parallel to the axis of a shaft. The terms "radial" and "radially" as used herein refer to a direction generally perpendicular to the axis of a shaft. The terms "fluid" and "fluids" refer to liquids, gases, and combinations thereof.

The terms "axially inner" or "axially inboard" as used herein refer to the portion of the stationary equipment and a mechanical seal proximate the stationary equipment employing the mechanical seal. Conversely, the terms "axially outer" or "axially outboard" as used herein refer to the portion of stationary equipment and a seal assembly distal from the mechanical system.

The term "radially inner" as used herein refers to the portion of the mechanical seal proximate a shaft. Conversely, the term "radially outer" as used herein refers to the portion of the mechanical seal distal from a shaft.

The terms "stationary equipment" and/or "static surface" as used herein are intended to include any suitable stationary structure housing a shaft or rod to which a seal having a gland is secured.

The terms "process medium" and/or "process fluid" as used herein generally refers to the medium or fluid being transferred through the stationary equipment. In pump applications, for example, the process medium is the fluid being pumped through the pump housing.

The term "gland" as used herein is intended to include any suitable structure that enables, facilitates or assists securing the mechanical seal to the stationary equipment, while concomitantly surrounding or housing, at least partially, one or more seal components. If desired, the gland can also provide fluid access to the mechanical seal. Those of ordinary skill will also recognize that the gland assembly can form part of the mechanical seal assembly or form part of the stationary equipment.

The term "slurry" or "slurry process fluid" as used herein is intended to include a process or other type of fluid that contains solid particles or particulates. As such, the slurry can be a mixture of denser solid material particulate material that is suspended in a carrier fluid, such as water. The most common use of slurry is as a means of transporting solids or separating minerals, where the carrier fluid is pumped by a device, such as a centrifugal pump, that employs the mechanical seal assembly of the present invention. The size of the solid particles can vary in size. The particles may settle below a certain transport velocity and the mixture can behave like a Newtonian or a non-Newtonian fluid. Depending on the mixture, the slurry can be abrasive and/or corrosive. The fluid can be, for example, a Newtonian fluid having or exhibiting Newtonian properties, namely, the viscosity only varies as a response to changes in temperature or pressure. Specifically, the viscosity of a Newtonian fluid remains constant independent of the amount of shear applied thereto for a constant temperature. Thus, Newtonian fluids have a linear relationship between viscosity and shear stress. The Newtonian fluid has the ability to settle out the particulates from the carrier fluid relatively easily and quickly. The Newtonian fluids can also be referred to as a settling slurry. The particulates in the settling slurry are typically greater than or equal to about 100 µm. The fluid can also be a non-Newtonian fluid having or exhibiting non-Newtonian properties, such that when a shear force is applied thereto, the viscosity of the non-Newtonian fluid decreases or increases as a function of the type of fluid. The non-Newtonian fluid has difficultly settling out particulates, and hence is also referred to as a non-settling slurry (e.g., homogenous mixture). In non-settling slurries, the fluid includes a more homogenous mixture of the fluid and particulates. The particulates in the non-settling slurry are typically less than about 100 µm. The slurry can different types of slurries, such as a clean slurry, a light slurry, or a heavy slurry.

FIGS. 1-6C depict a mechanical seal 10 according to the teachings of the present invention. The illustrated mechanical seal 10 is preferably concentrically disposed about a shaft (not shown) and can be secured to an external wall of stationary equipment by fasteners, such as bolts, that seat between the illustrated bolt tabs 14. The mechanical seal 10 constructed in accordance with the teachings of the present invention provides a fluid-tight seal, thereby preventing a process medium, e.g., hydraulic fluid, from escaping the stationary equipment. The fluid-tight seal is achieved by a pair of sealing members, illustrated as a rotary seal ring 20 and a stationary seal ring 30, that form a seal therebetween. Each of the seal rings 20 and 30 has a pair of seal ring halves or segments and has a smooth arcuate sealing surface 21, 31, respectively. The smooth arcuate sealing surface 21, 31 of each seal ring is biased into sealing contact with the corresponding sealing surface 21 or 31 of the other seal ring. Preferably, the seal rings 20, 30 are split into a pair of segments, respectively, to facilitate installation, as described below. The sealing surfaces 21, 31 of the seal rings provide a fluid-tight seal operable under a wide range of operating conditions, including a vacuum condition. The rotary seal ring 20 is mounted within a holder assembly 110, which is in turn mounted within a gland assembly 40, and the stationary seal ring 30 is mounted within the gland assembly 40.

As shown in FIGS. 2A-3B and 5B, the illustrated holder assembly 110 defines a space 111 for receiving and retaining the rotary seal ring 20. The holder assembly 110 can be split to facilitate easy assembly and installation. In one embodiment, the holder assembly 110 comprises a pair of arcuate holder segments 112 that mate to form the annular holder assembly 110. The holder assembly 110, or each arcuate holder segment 112 if the holder assembly is split, has a radially outer surface 116 facing the gland assembly 40 and a first generally radially inner surface 124 (in addition to the radial innermost surface 138) for sealing against the seal ring 20 and defining the space 111 for receiving and retaining the rotary seal ring 20.

A sealing element, such as O-ring 188, is concentrically disposed about the rotary seal ring 20 to seal between the rotary seal ring 20 and the holder assembly 110. As shown, the O-ring 188 is preferably disposed about a radially outer surface 184 of an axially inner portion of the rotary seal ring 20 and seals against the radially inner surface 124 of the holder assembly 110. The radially inner surface 124 of the holder assembly 110 may include a detent groove 189 for receiving and seating the O-ring 188 disposed about the rotary seal ring 20 to facilitate assembly and operation of the mechanical seal and to maintain the rotary seal ring 20 in an optimal position.

Other sealing members can be provided to seal the interfaces between different components of the mechanical seal 10. For example, a flat annular elastomeric gasket 60 can be employed to seal the interface between the gland assembly 40 and the stationary equipment. Further, a holder gasket 160 can be mounted in a corresponding groove 158 to seal the holder segments 112 together if the holder assembly 110 is split. A holder/shaft elastomeric member, illustrated as O-ring 142, sits in a holder groove 140 formed along the inner surface 138 and seals between the rotary seal ring holder assembly 110 and the shaft. A stationary seal ring/gland elastomeric member, illustrated as O-ring 202, seals at an interface between the stationary seal ring 30 and the gland assembly 40 and provides radially inward pressure on the stationary seal ring 30. A gland gasket 76 can seat within a gland gasket groove 70 (FIG. 3A) so as to form a seal between the gland halves when assembled together. One skilled in the art will recognize that the mechanical seal assembly 10 may have any suitable means for sealing between different components.

In addition, the illustrated split mechanical seal 10 can include an anti-rotation mechanism (not shown) such as a pin or a flat surfaced element that extends axially between the rotary seal ring 20 and the holder assembly 110 to prevent relative rotary movement between the rotary seal ring and the holder assembly 110. Those of ordinary skill will also recognize that suitable fasteners, such as bolts, can be employed to secure together the gland halves and the holder halves. Certain components of the mechanical seal 10 of the present invention are similar to the mechanical seal assemblies described in U.S. Pat. Nos. 5,571,268, 7,708,283 and 10,352,457, the contents of which are herein incorporated by reference.

The illustrated holder assembly 110 for mounting the rotary seal ring 20 is disposed in a chamber 24 formed by the gland assembly 40, and spaced radially inward therefrom. It should be understood, however, that the holder assembly 110 need not be disposed within the gland assembly 40. Rather, the holder assembly 110 can be axially spaced from the gland assembly 40. The holder assembly 110 also includes an inwardly stepped surface that forms a second, axially-extending face 133. The radially inner surface 124 and the axially extending face 133 have a radially inward-extending first wall 132 formed therebetween. As shown, the inner axially extending face 133 and the radially innermost axially extending face or holder inner face 138 define an axially innermost second wall 134 therebetween that serves as the bottom of a cavity or seal ring receiving space 111 (FIG. 2B) that seats the rotary seal ring 20.

According to one embodiment, the sealing element or O-ring 188 for sealing between the rotary seal ring 20 and the rotary seal ring holder 110 seats in a groove 189, such as a detent groove, formed on the radially inner surface 124 of the holder assembly 110. The detent groove 189 is sized, located and configured to receive a radially outermost portion of the O-ring 188 so as to position and seat the O-ring 188 relative to the holder assembly 110 during installation without compromising performance. The detent groove 189 preferably seats the O-ring 188 above the stepped wall 132. Alternatively, the detent groove 189 seats the O-ring in another location between the holder assembly 110 and the rotary seal ring 20. A significant advantage of the detent groove 189 and the placement of the groove on the radially inner surface 124 of the holder is that it reduces the amount of compression needed to seat the O-ring 188 in the groove.

Figure 3A:
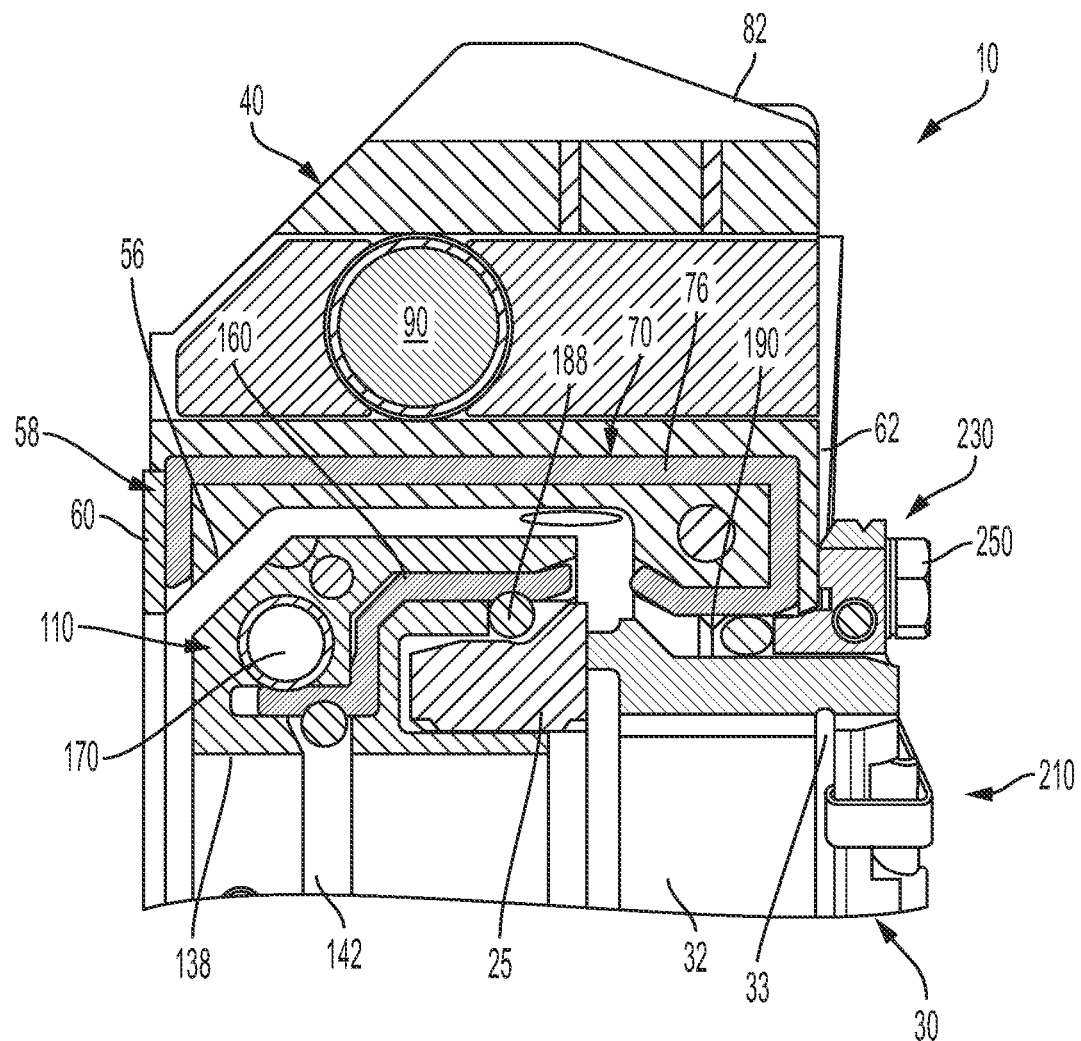
FIG. 3A is a partial cross-sectional view of the mechanical seal showing the sealing elements associated with the sealing rings in an engaged loaded position according to the teachings of the present invention.
Figure 3B:
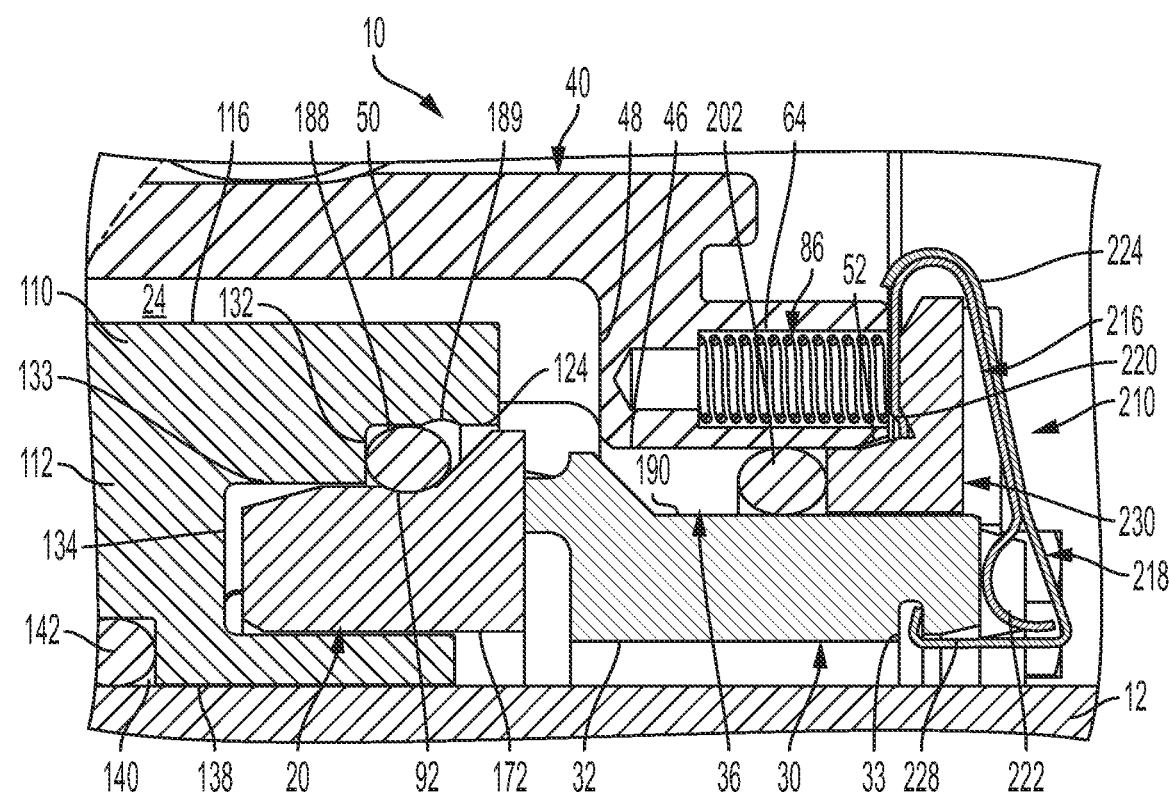
FIG. 3B is another partial cross-sectional view of the mechanical seal showing the sealing elements associated with the sealing rings in an engaged loaded position according to the teachings of the present invention.
Figure 4A:
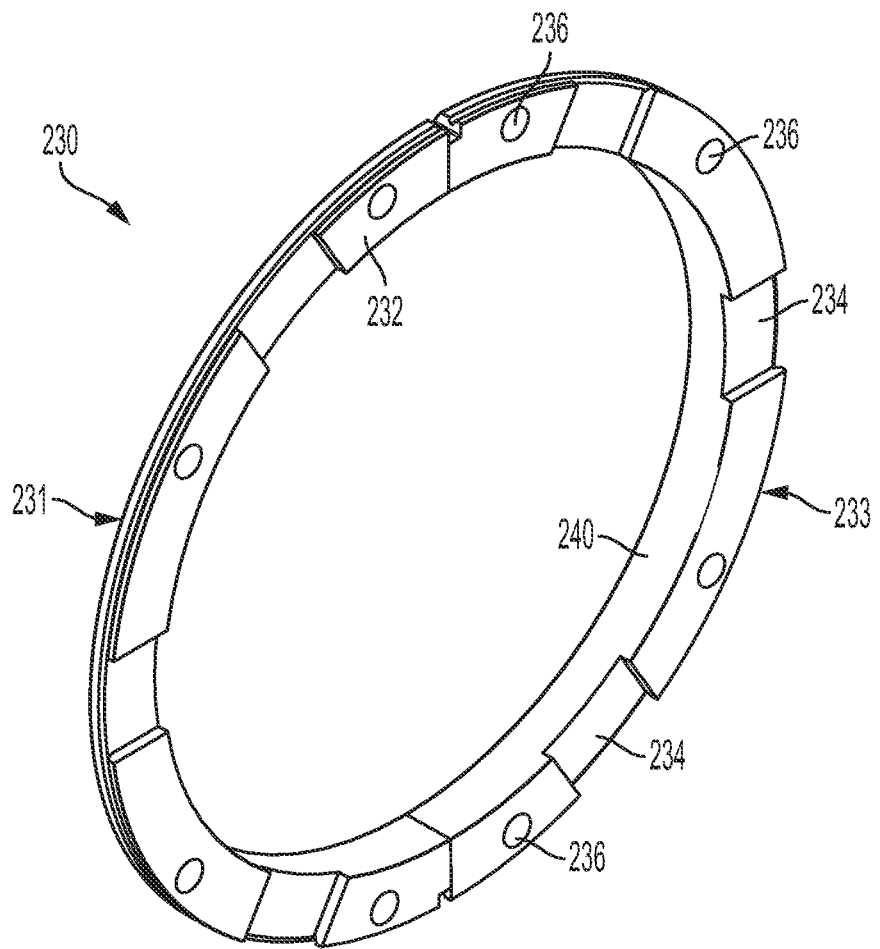
FIG. 4A is a perspective view of the spring holder plate employed by the mechanical seal of the present invention that can be employed to move the sealing elements associated with the sealing rings into the engaged and unengaged positions according to the teachings of the present invention.
Figure 4B:
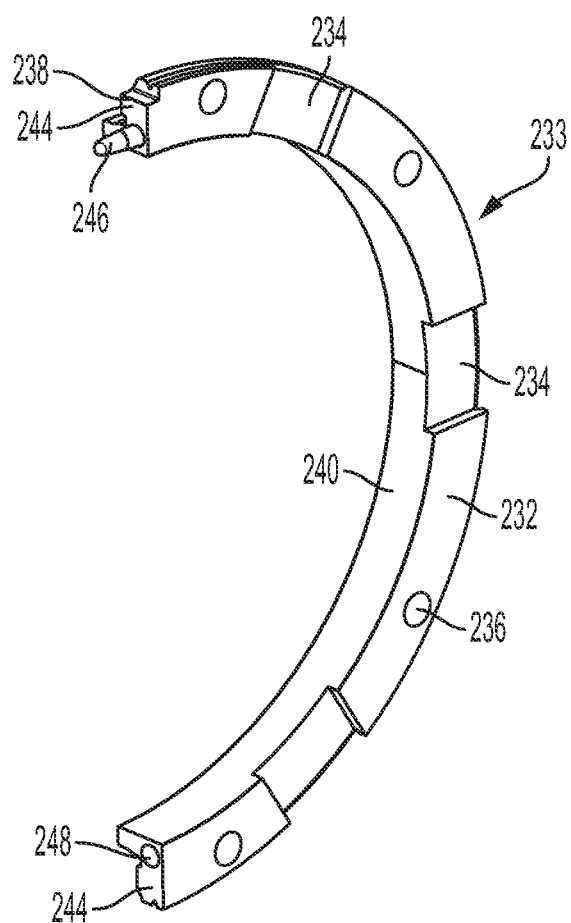
FIG. 4B is a perspective view of one of the spring holder segments of the spring holder plate according to the teachings of the present invention.
Figure 5A:
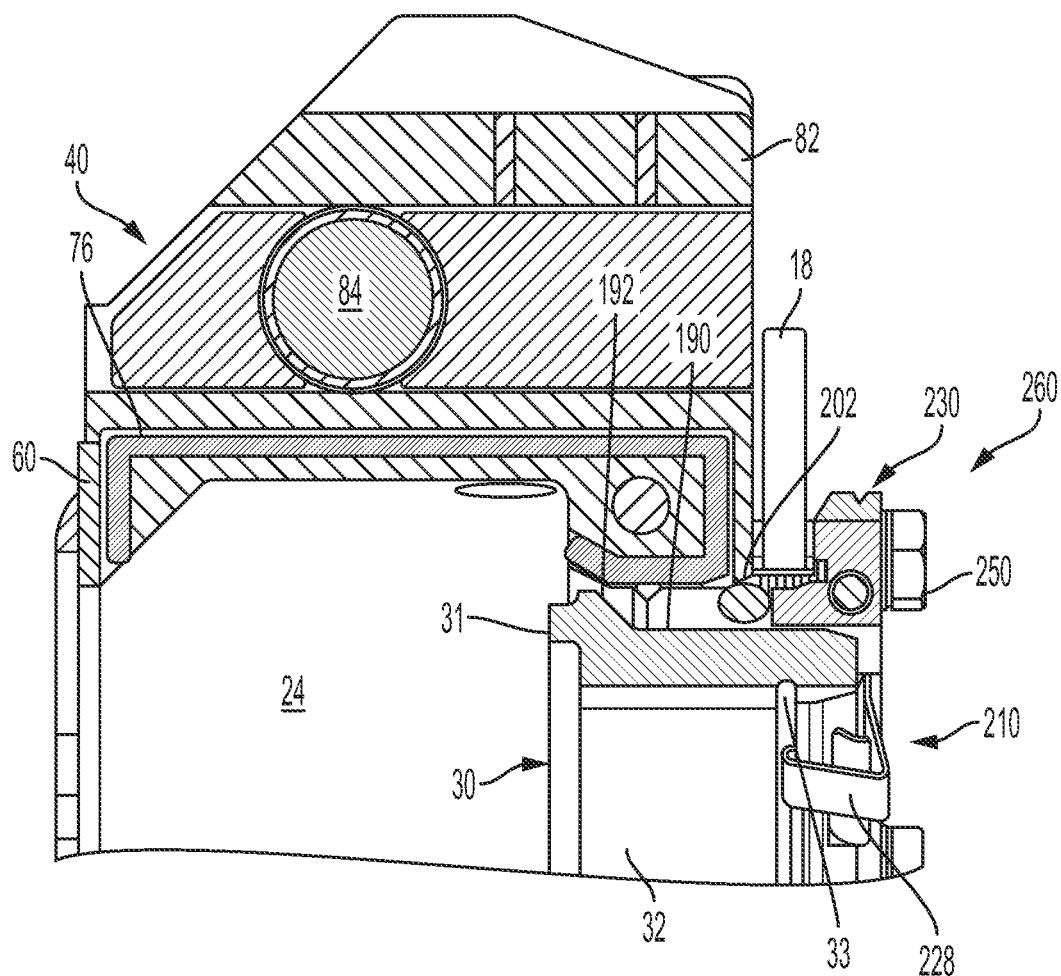
FIG. 5A is a partial cross-sectional view of the mechanical seal showing the preassembled gland subassembly unit according to the teachings of the present invention.
Figure 5B:
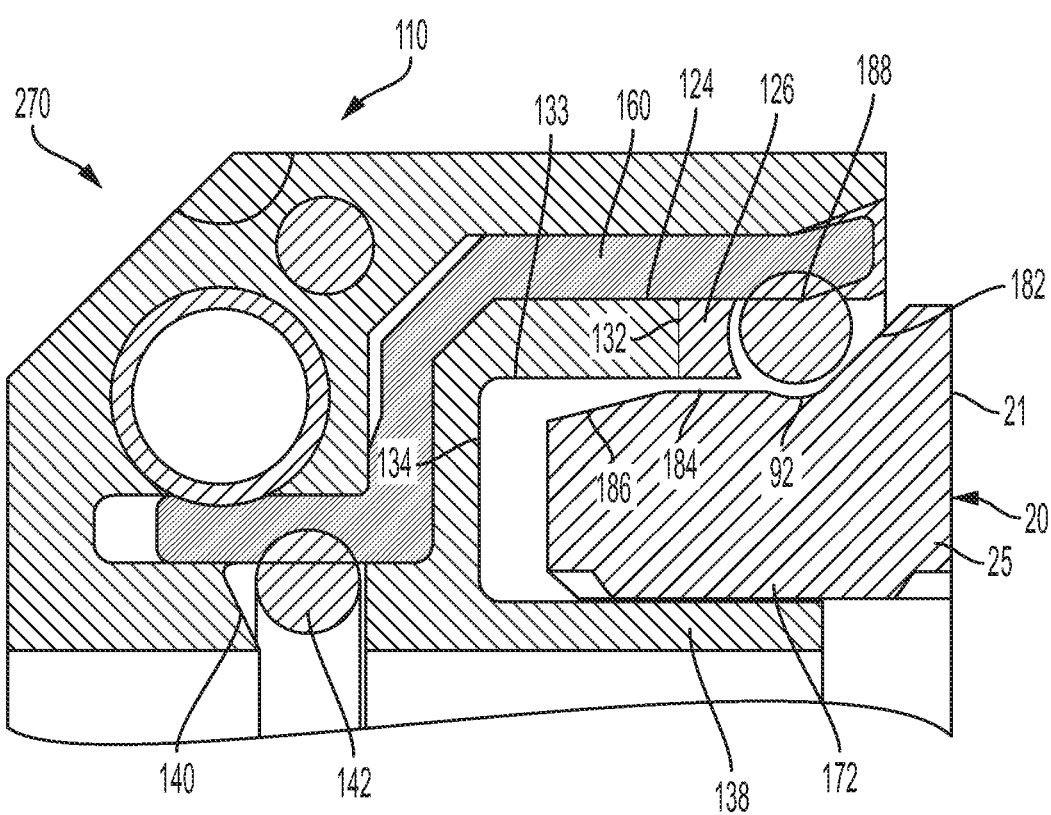
FIG. 5B is a partial cross-sectional view of the mechanical seal showing the preassembled holder subassembly unit according to the teachings of the present invention.

The illustrated rotary sealing ring 20 includes a substantially smooth arcuate inner surface 172 and an outer surface comprising several surfaces including a first outer slanted surface 182 that forms a skirt portion, a relatively flat outer surface 184, and an axially inwardly tapered or sloped outer surface 186. The rotary seal ring 20 also includes a smooth arcuate sealing surface 21 disposed at a top of the seal ring 20. A rotary seal ring detent groove 92 is formed on the flat outer surface 184 adjacent the first slanted surface 182, as best shown in FIGS. 3B and 5B. The detent groove 92 formed in the rotary seal ring 20 performs at least two primary functions: first, the groove 92 helps to position the rotary seal ring 20 in the correct location with respect to the holder assembly 110, and second, the groove 92 allows the rotary seal ring to be pre-assembled in the holder assembly 110 by creating a double capture groove (between the holder detent groove 189 and the rotary seal ring detent groove 92) that captures the O-ring 188 therebetween while concomitantly retaining the rotary seal ring 20 within the holder assembly 110. The inner surface 172 of the rotary seal ring may have formed thereon a generally rectangular notch (not shown) that mounts over a holder protrusion (not shown) for coupling the components together. The inner diameter of the rotary seal ring inner surface 172 is greater than the diameter of the shaft to permit mounting thereon. The diameter of the rotary seal segment outer surface 184 is equal to or slightly less than the diameter of the axially extending face 133 of the holder segment, for mounting engagement with the holder assembly 110. The diameter of the outermost surface of the rotary seal ring 20 is less than the inner diameter of the inner surface 124 of the holder assembly 110. One skilled in the art will readily recognize based on the teachings herein that the rotary seal ring 20 may have any suitable configuration for interfacing with and sealing against another sealing element, such as the stationary seal ring 30.

As shown in FIGS. 1-3B and 5A, the illustrated mechanical seal 10 also includes the gland assembly 40. The illustrated gland assembly 40 includes a pair of arcuate gland segments 41, 42 that mate to form the annular seal gland assembly 40. The gland segments 41, 42 can be configured to engage with each other to facilitate assembly and operation of the mechanical seal 10. The gland assembly segments 41, 42 can employ an interlock mechanism to facilitate engagement of the gland segments. Each of the illustrated gland segments 41, 42 has an inner surface that has a first face 46 disposed at an axial outboard end that has an angled lead-in surface 52 and an integrally formed and stepped second face 50 that extends radially outwardly from the first face 46. The first face 46 and the second face 50 form, in combination, a first connecting annular wall 48. The stepped second face 50 transitions to a radially inwardly sloped surface 56. The gland segment inner surface formed by faces 46, 48, 50, and 56 define the space 24 for receiving the holder assembly 110, as described above. Further, each of the gland segments 41, 42 also has integrally formed therewith a pair of screw housings 80, 82. Each of the screw housings 80, 82 can include a transverse fastener-receiving aperture 84 formed substantially therethrough. The transverse aperture 84 mounts a screw 90 for securing together the gland segments 41, 42. The gland assembly 40 also includes a housing gasket groove 58 formed along a bottom inboard surface 59 of the gland assembly 40. The groove 58 seats the flat, annular elastomeric gasket 60. The gland assembly 40 also includes an axially outer topmost surface 62 that has a plurality of spring holes 64 and a plurality of fastener holes 66 formed therein. The spring holes 64 mount spring elements 80 and the fastener holes mount suitable fasteners, such as the bolts 250.

Figure 6A:
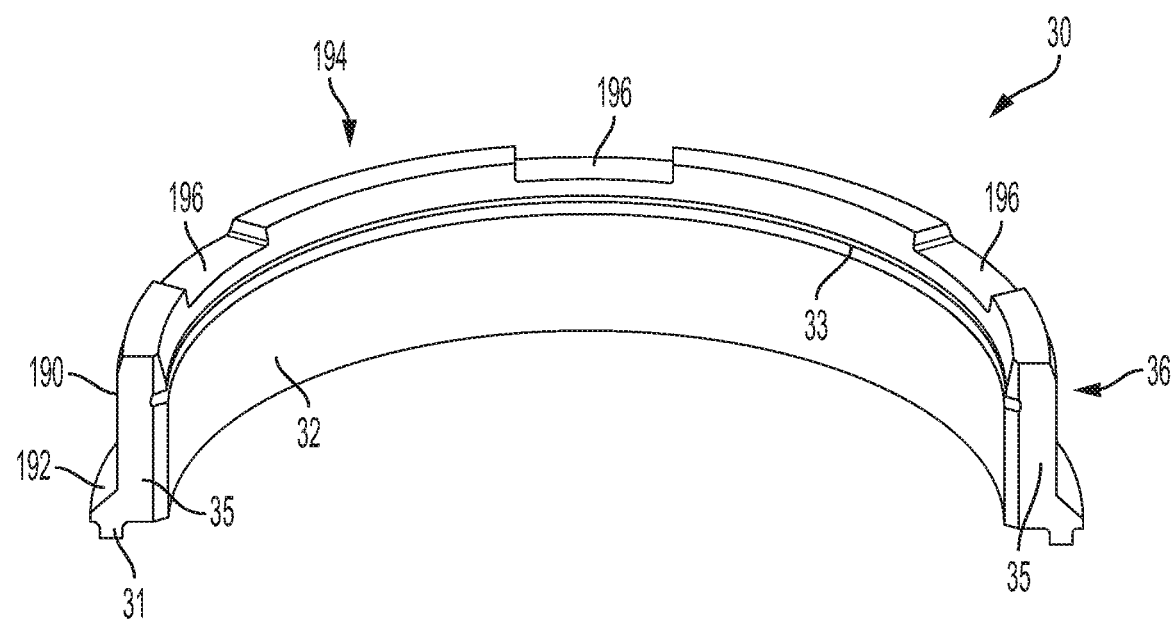
FIG. 6A is a perspective view of a stationary seal ring segment employed by the mechanical seal of the present invention.

As shown in FIGS. 2A-3B, 5A, and 6A-6C, and in particular as shown in FIG. 6A, the illustrated stationary seal ring 30 can similarly include a pair of arcuate seal ring segments, each identical or substantially identical to the other. The illustrated stationary seal ring segments can have a substantially smooth arcuate inner surface 32 extending parallel to the shaft axis and an opposed outer surface 36. The inner surface 32 has formed along the inner wall a circumferentially extending recess or groove 33 that is sized and configured for receiving a retaining portion of a biasing clip assembly 210, described in further detail below, for mounting and retaining the stationary seal ring 30 to a spring holding plate 230. The groove 33 can be continuous or non-continuous. If non-continuous, the groove can be formed as a series of recesses that are spaced apart along the inner surface 32. The outer surface 36 of the stationary seal ring 30 preferably has an axially extending first outer surface 190 that terminates in a radially outward extending sloped abutment surface 192. The stationary seal ring 30 preferably has an axially outer top surface 194 and an opposed smooth axially inner arcuate ring sealing surface 31 disposed at the bottom of the seal ring. The top surface 194 has a series of recesses or cut-outs 196 formed along the top surface that are sized and configured for selectively seating and/or engaging at least a portion of the biasing clip assembly 210. This arrangement helps align and seat the stationary seal ring 30 in the chamber 24, as well as functioning as a mechanical impedance for preventing the stationary seal ring 30 from rotating with the shaft 12 and the rotary seal ring 20.

The inner diameter of the stationary seal ring 30 as defined by the inner surface 32 is greater than the shaft diameter, and can if desired be greater than the diameter of the inner surface 172 of the rotary seal ring 20, thereby allowing relative motion therebetween. Therefore, the stationary seal ring 30 remains stationary while the shaft rotates. An elastomeric sealing member, e.g., O-ring 202, provides a radially inward biasing force sufficient to place the seal ring segment sealing faces 35 in sealing contact with the other stationary seal ring segment. Additionally, the O-ring 202 forms a fluid-tight and pressure-tight seal between the inner surface 46 of the gland assembly 40 and the stationary seal ring 30. The O-ring 202 seats in a first mounting region 204 defined by the gland first face 46 and the annular wall 48 and the outer surface 190 of the stationary seal ring 30 when disposed in the loaded position. In a preferred embodiment, the abutment 192 of the stationary seal ring 30 forms an angle relative to the stationary seal ring outer surface 190 preferably in the range of between about 30° and about 60°, and most preferably about 45°. The stationary seal ring 30 is preferably composed of a carbon or ceramic material, such as alumina or silicon carbide and the like.

The biasing assembly of the split mechanical seal 10 of the present invention, illustrated as a biasing clip assembly 210, also functions as an axial biasing means by providing resilient support for the stationary and rotary seal rings 20, 30 by axially biasing the seal rings such that the stationary and rotary sealing surfaces 21 and 31 are disposed in sealing contact with each other. As illustrated in FIGS. 2A-3B, the seal rings 20, 30 are floatingly and non-rigidly supported in spaced floating relation relative to the rigid walls and faces of the gland and holder assemblies 40, 110. This floating and non-rigid support and spaced relationship permits small radial and axial floating movements of the rotary seal segments and the stationary seal segments with respect to the shaft 12, while still allowing the rotary sealing surface 21 to follow and to be placed in sealing contact with the smooth arcuate sealing surface 31 of the stationary seal ring 30. Thus, the rotary and stationary seal ring sealing surfaces 21 and 31 are self-aligning as a result of this floating action.

The mechanical seal 10 of the present invention preferably employs a series of biasing clip assemblies 210 that are mounted on the axially outermost end of the gland assembly 40. Since the biasing clip assemblies 210 are identical, we need only describe herein one of the clip assemblies. The biasing clip assembly 210 preferably employs a pair of generally C-shaped spring clips defined as an inner spring clip 216 and an outer spring clip 218. The inner spring clip 216 has a first lower end that has a ridge portion 220 that seats within a recessed portion 242 of the spring holder plate 230. The engagement of the ridge portion 220 of the inner spring 216 with the recessed portion 242 helps secure the inner spring clip 216 thereto. The inner spring clip 216 further includes at an opposite end a bent portion 222 that seats on or can be disposed in contact with the recessed portion 196 formed in the top surface 194 of the stationary seal ring 30 to provide an axial biasing force thereto. The bent portion 222 thus functions as an axial biasing member for applying an axial biasing force to the seal rings 20, 30. The axial biasing force as is known to those of ordinary skill in the art is an inboard directed force that helps place the seal faces 21, 31 of the seal rings 20, 30, respectively, in sealing contact with each other.

The illustrated mechanical seal 10 also includes an axially movable spring holder plate 230, as shown for example in FIGS. 2A-4B. The illustrated spring holder plate 230 can be formed from a pair of plate segments 231, 233 that can be connected together. The spring holder plate 230 has an annular main body having a top surface 232 having a plurality of cut-outs or recesses 234 formed therein that are circumferentially spaced apart along the circumference of the main body. The top surface 232 also has formed therein a series of fastener-receiving apertures 236 for receiving fasteners, such as for example the bolts 250. The spring holder plate 230 also includes a bottom surface 238 having a recessed portion 242 formed adjacent an axially extending flange portion 240. The recesses 234 and the recessed portion 242 are configured for seating a portion of the biasing clip assembly 210, such as selected portions of the inner spring clip 216. The spring holder plate segments have end faces 244 that are configured for mating with the end faces of the other spring holder plate segment. One of the end faces 244 has a male type projection or protrusion 246 and the other end face has a female type hole or surface feature 248. The protrusion 246 is configured to seat within a corresponding hole 248 formed in the opposed end face 244 of the other spring holder plate segment. Similarly, the hole 248 is configured to receive a corresponding protrusion formed on the opposed end face of the other holder plate segment. The protrusions 246 and holes 248 enable the holder plate segments to be mechanically coupled together. The spring holder plate 230 is sized and dimensioned such that the flange portion 240 seats between the inner surface 46 of the gland assembly 40 and the outer surface 190 of the stationary seal ring 30. The spring holder plate 230 when tightened by the bolts 250 compresses the springs 86 and engages with the O-ring 202. The O-ring 202 is pushed by the flange portion 240 past the lead-in surface 52 of the gland assembly 40 and into the mounting region 204. Simultaneously, the stationary seal ring 20 is axially pressed towards the rotary seal ring 20 by the biasing clip assembly 210.

Figure 6B:
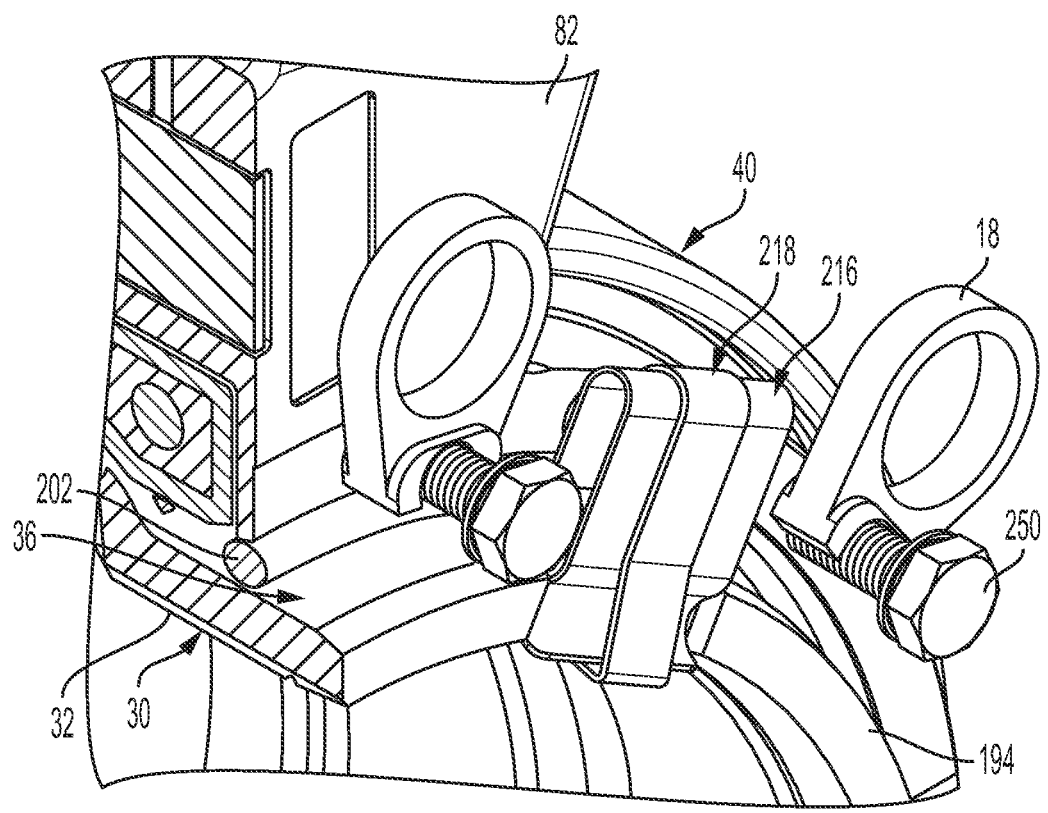
FIG. 6B is an exploded partial cross-sectional view with the spring holder plate removed showing the bolts, biasing clip assembly, and spacer elements employed by the mechanical seal of the present invention.
Figure 6C:
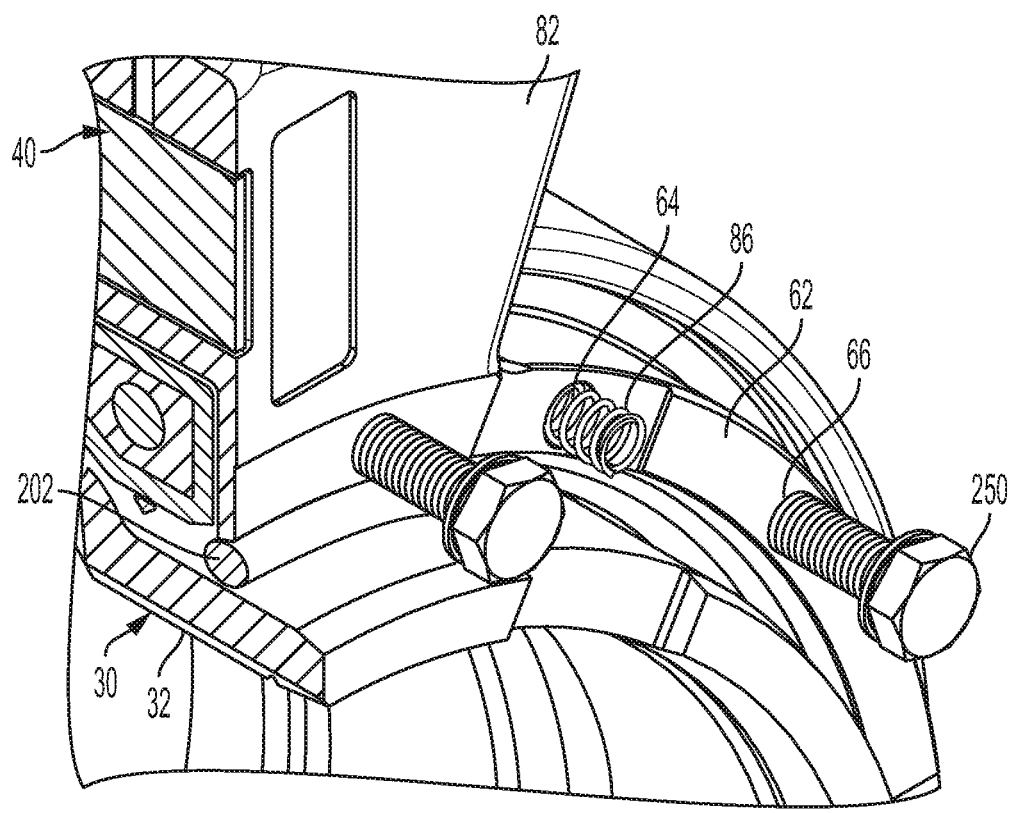
FIG. 6C is an exploded partial cross-sectional view with the spring holder plate, biasing clip assemblies and spacing elements removed showing the bolts and springs employed by the mechanical seal of the present invention.
Figure 7:
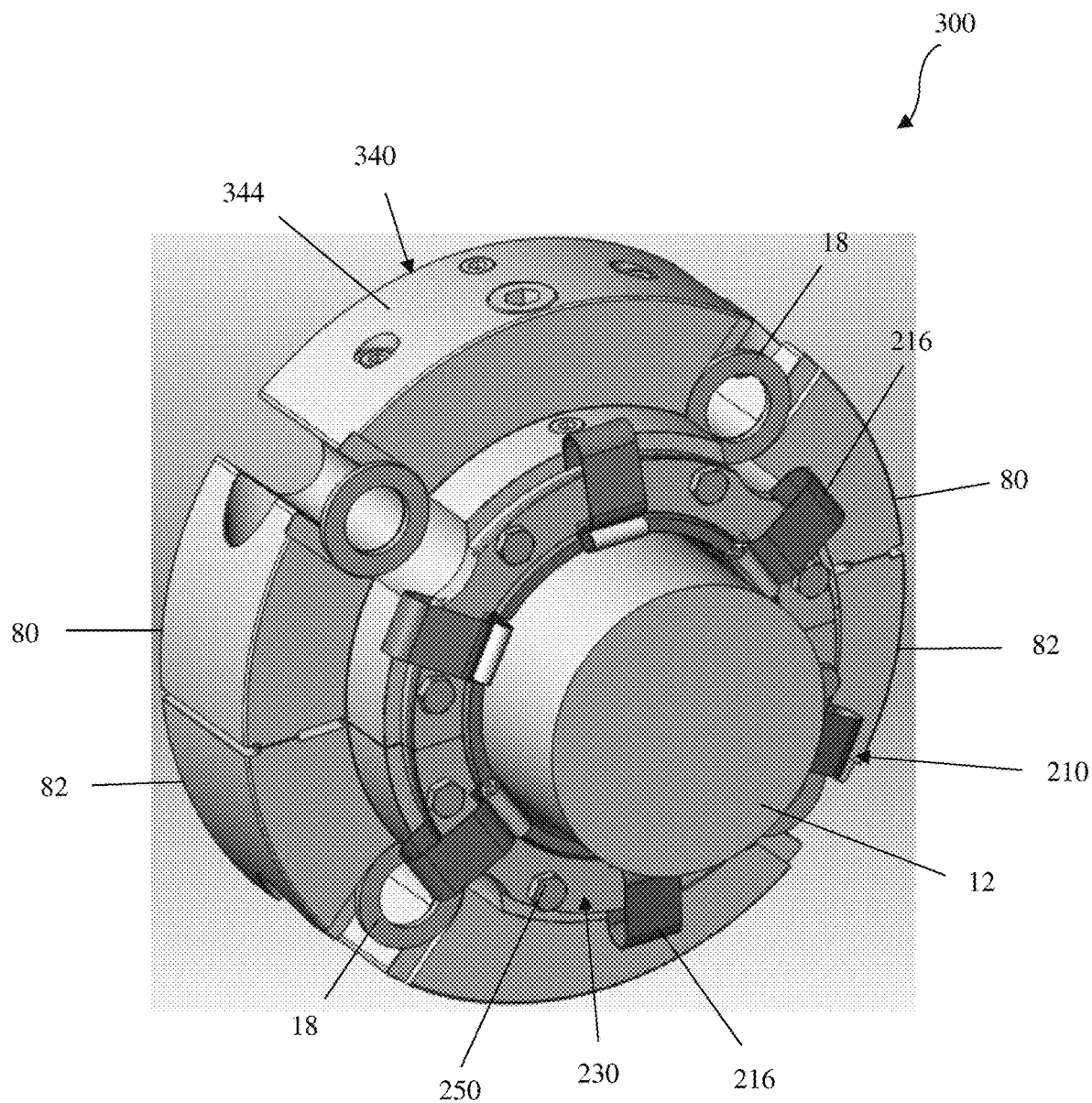
FIG. 7 is a perspective view of the mechanical seal assembly of the present invention.
Figure 8:
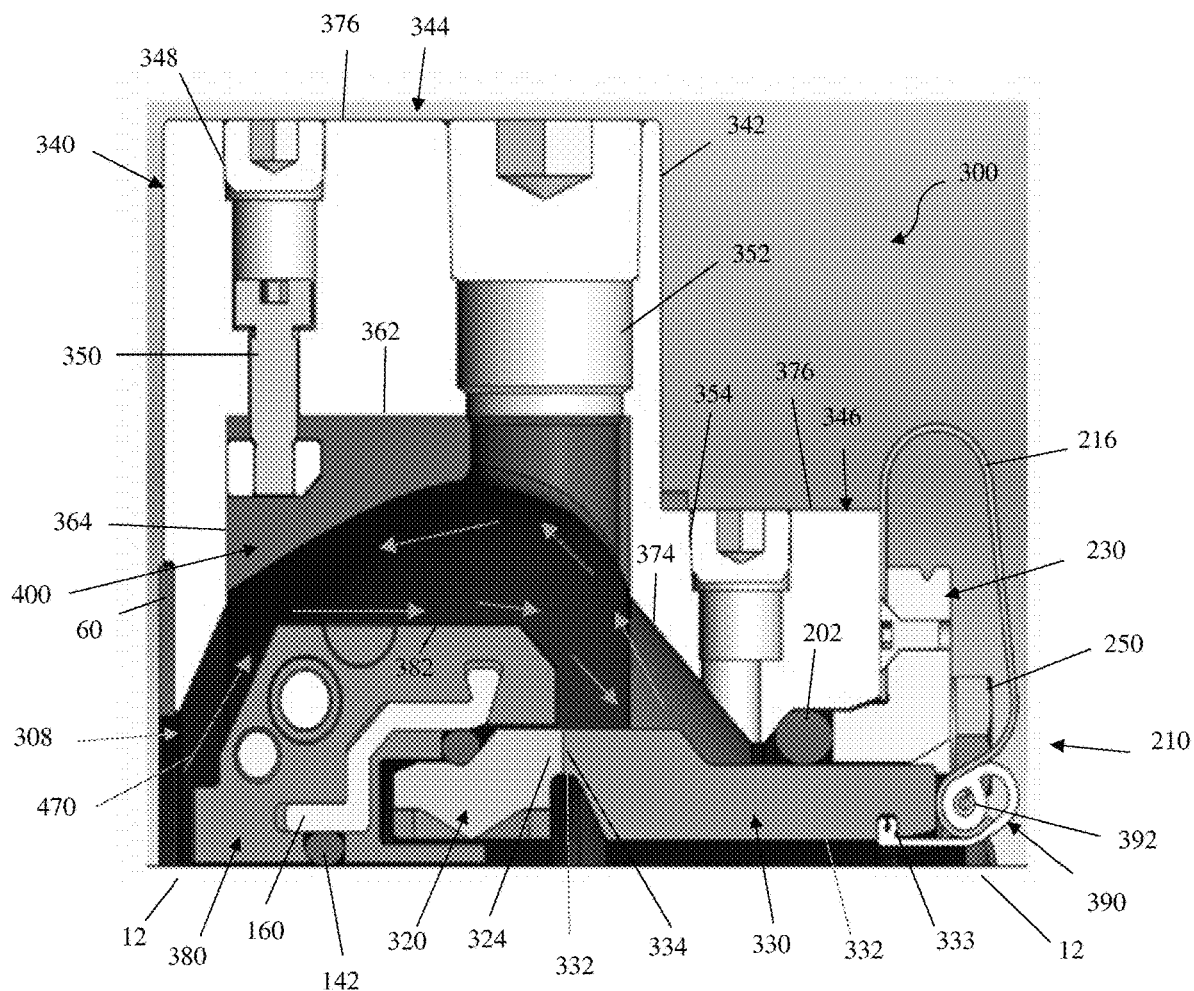
FIG. 8 is a partial cross-sectional view of the mechanical seal assembly of FIG. 7 according to the teachings of the present invention.
Figure 9:
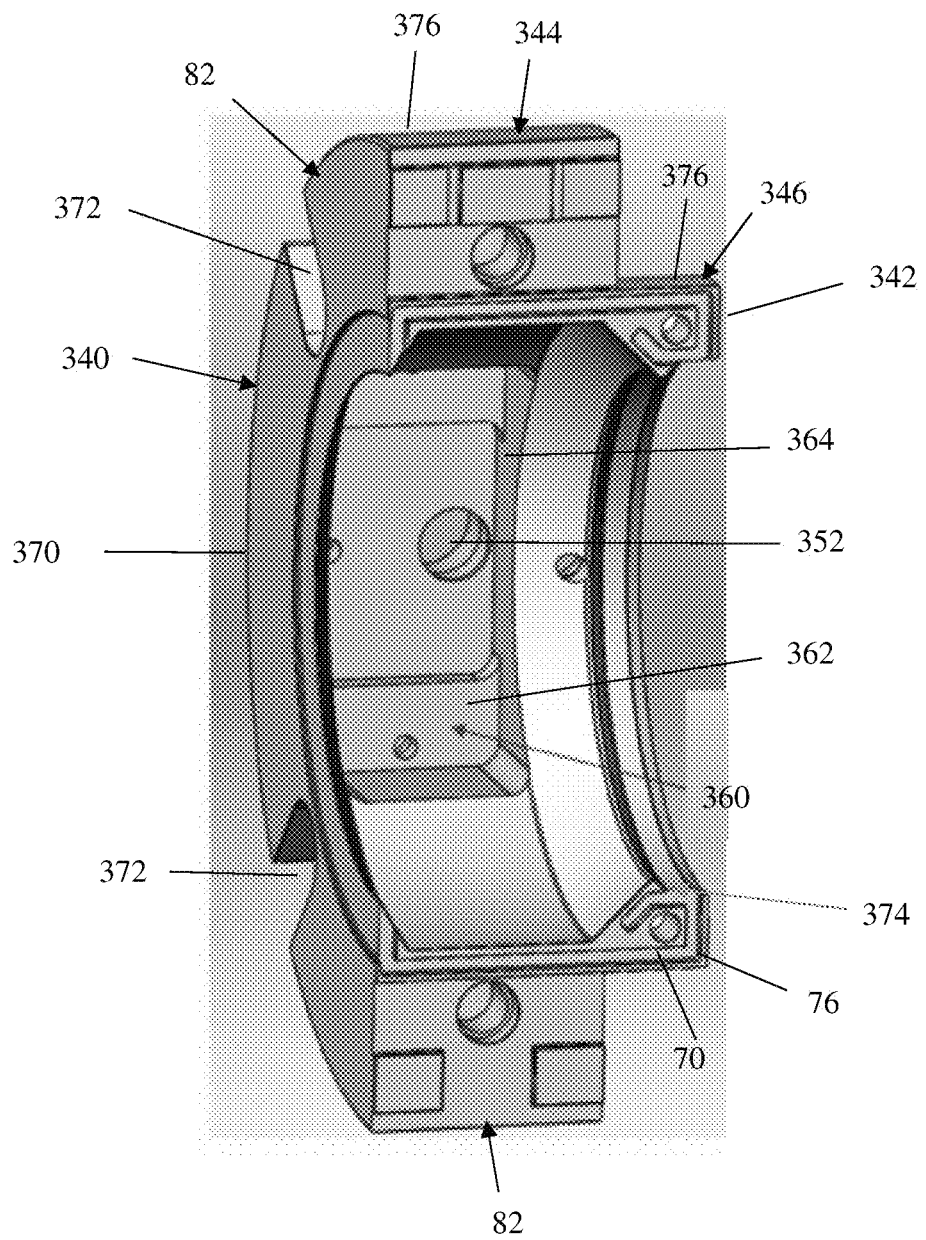
FIG. 9 is a perspective view of a segment of the gland assembly showing the gland chamber formed in an inner surface thereof according to the teachings of the present invention.
Figure 10:
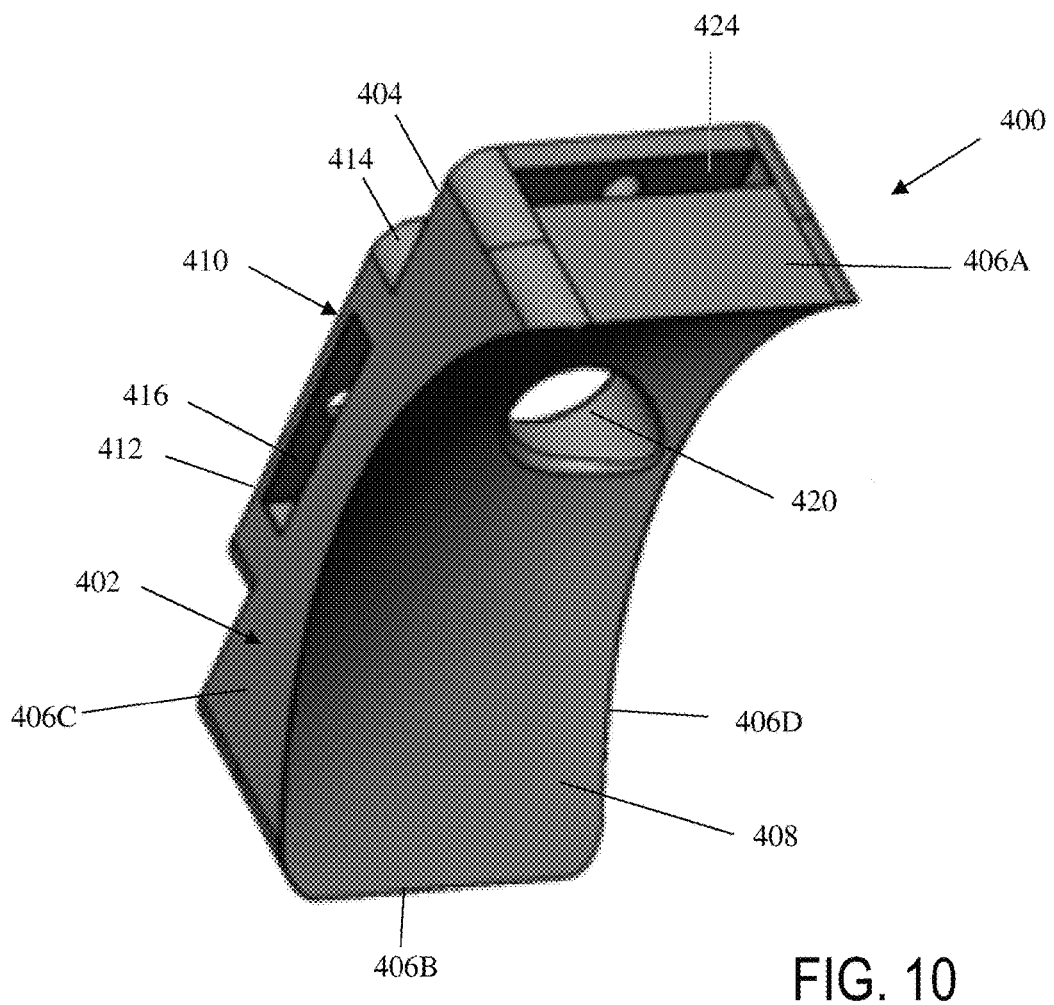
FIG. 10 is perspective view of one embodiment of a fluid insert element suitable for mounting in the gland chamber according to the teachings of the present invention.
Figure 11:
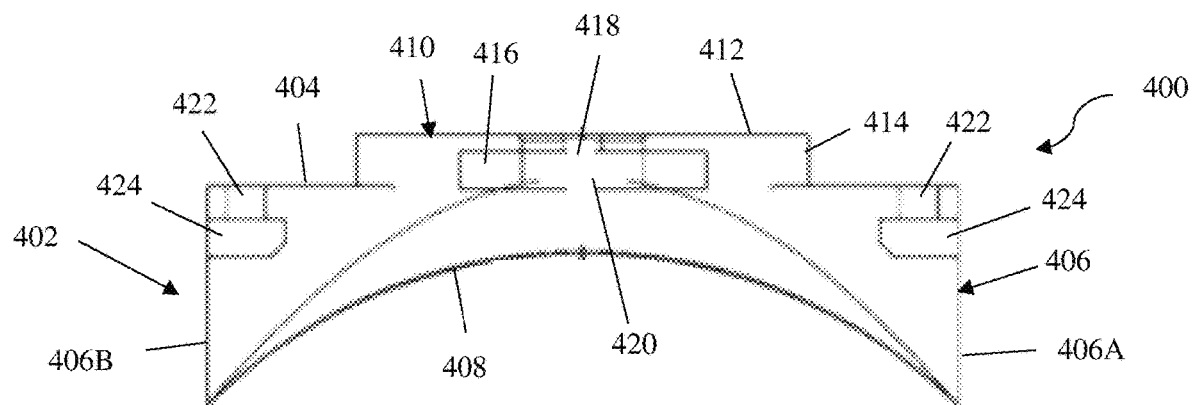
FIG. 11 is a cross-sectional view of the fluid insert element of FIG. 10 according to the teachings of the present invention.
Figure 12:
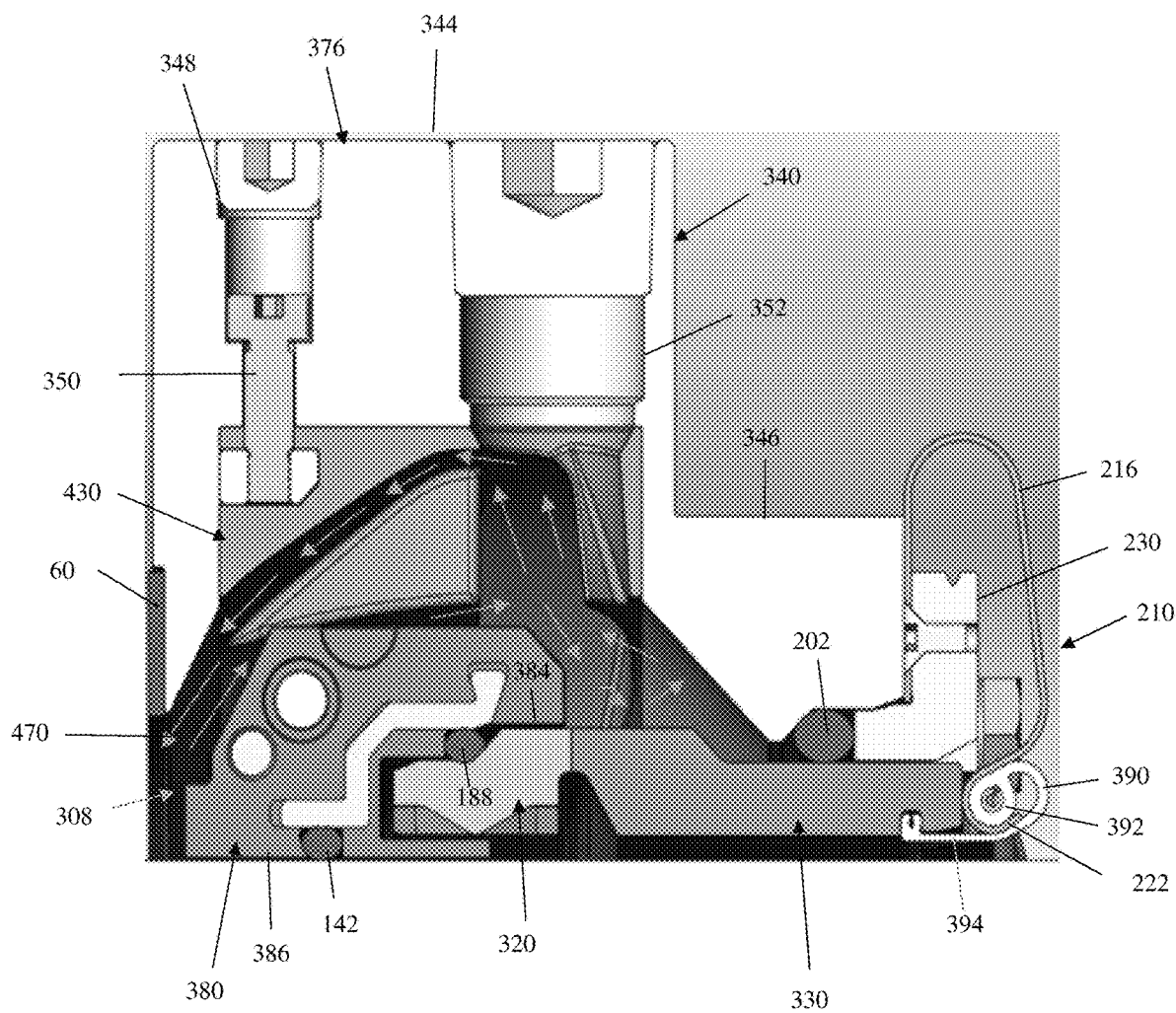
FIG. 12 is a partial cross-sectional view of the mechanical seal assembly of FIG. 7 showing the mounting another embodiment of the fluid insert element according to the teachings of the present invention.
Figure 13:
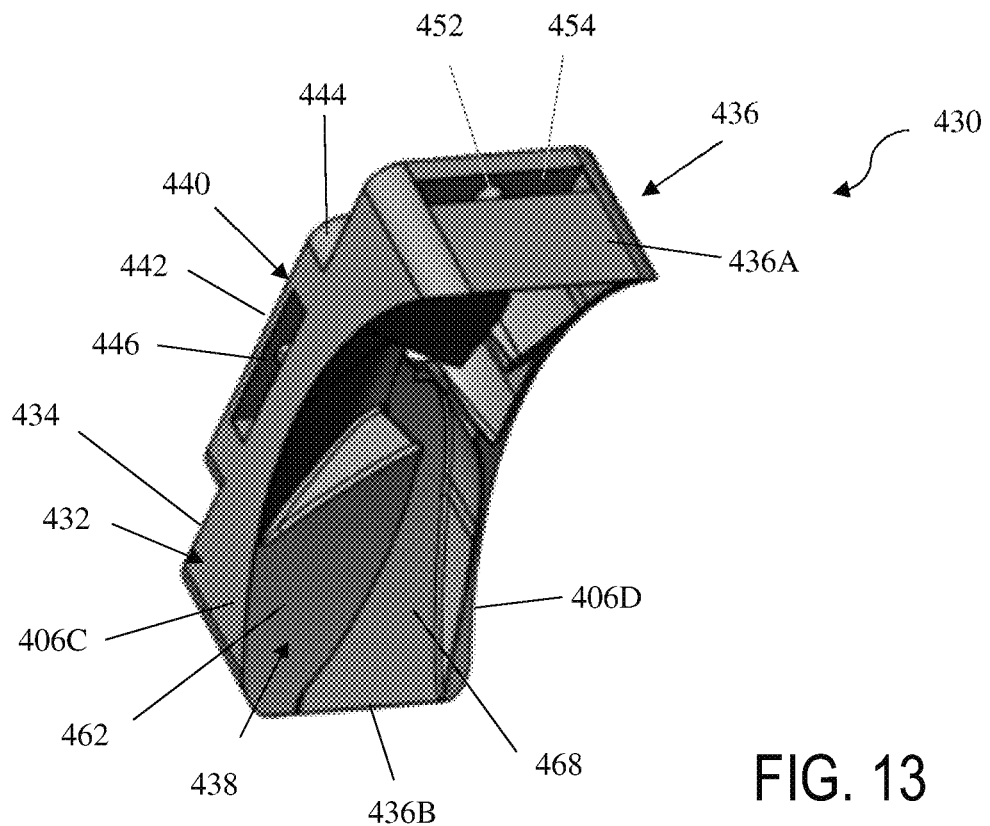
FIG. 13 is a perspective view of another embodiment of the fluid insert element suitable for mounting in the gland chamber according to the teachings of the present invention.
Figure 14:
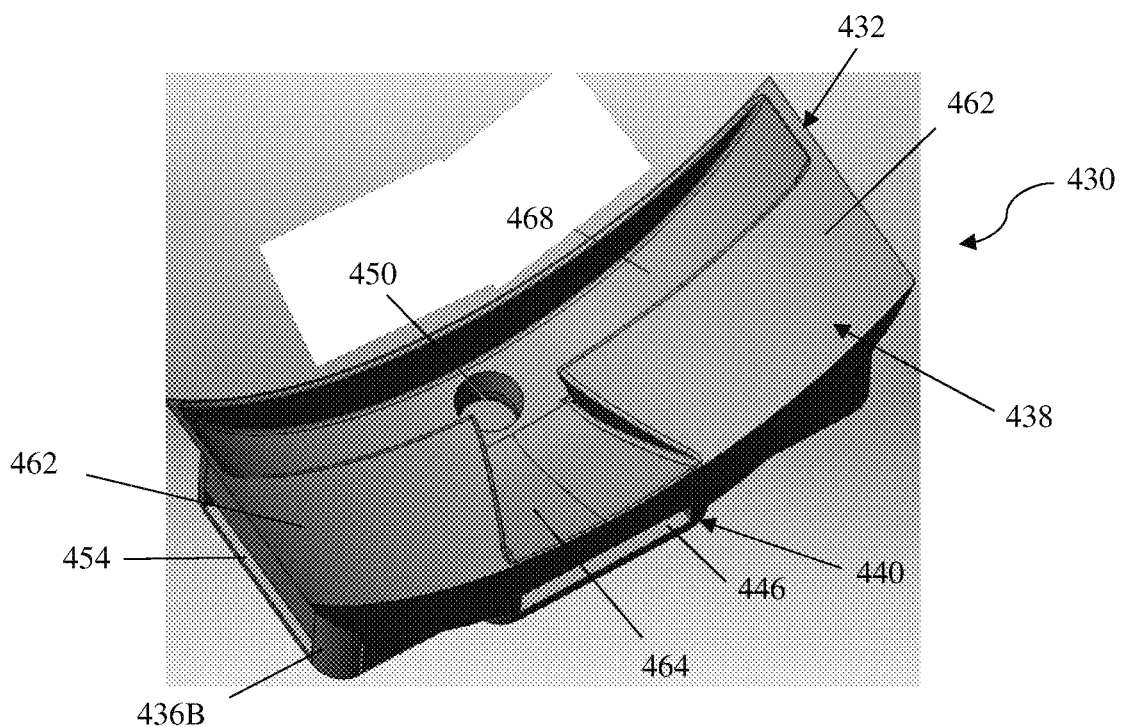
FIG. 14 is a perspective view of the bottom surface of the fluid insert element of FIG. 13 according to the teachings of the present invention.

The biasing clip assembly 210 of the mechanical seal 10 of the present invention includes an outer spring clip 218 that is adapted to be mounted over the inner spring clip 216. The outer spring clip 218 has a main body that includes a generally rounded first end portion 224 that is configured to be mounted on and engage the outer surface of the inner spring clip 216, as best illustrated in FIGS. 2B, 3B and 6B. The outer spring clip 218 also includes an opposite end that has a bent tab portion 228 extending outwardly therefrom. The bent tab portion 228 is configured to overlay the bent portion 222 of the inner spring clip 216 and to connect to and engage the recess 33 formed along the inner surface 32 of the stationary seal ring 30. The bent tab portion 228 of the outer spring clip 218 retains or mounts the stationary seal ring 30 to the gland assembly 40 by engaging with the recess 33. By retaining or mounting the stationary seal ring 30 to the gland assembly 40, the components of the mechanical seal 10 can be pre-assembled, which helps facilitate easy installation of the split mechanical seal 10. Those of ordinary skill in the art will readily recognize that the inner and outer spring clips 216, 218 can have any suitable shape or configuration provided that the clips can engage with the spring plate holder 230 and the stationary seal ring 30 so as to apply an axial biasing force to the stationary seal ring and to the spring plate holder.

In assembly and during operation, the mechanical seal 10 can be composed of four selected halves or segments that have selected seal components that are preassembled together to form subassembly units. For example, as shown in FIG. 5A, each gland segment of the gland assembly 40 can be preassembled with selected components to form a gland subassembly unit 260 that includes a corresponding half or segment of the stationary seal ring 30, the spring holder plate 230, the O-ring 202, and a selected number of biasing clip assemblies 210 that correspond to the number of recesses 234 formed in the top surface 232 of the spring holder plate 230. The inner spring clip 216 is mounted on and about the spring holder plate 230 and then the outer spring clip 218 is mounted over or on top of the inner spring clip 216. The bent tab portion 228 of the outer spring clip 218 engages with the recess 33 formed along the inner surface 32 of the stationary seal ring 30 and the opposite end of the spring clips engage with the spring holder plate 230. The springs 86 are mounted in the spring holes 64 formed in the top surface 62 of the gland assembly 40 and the spring holder plate 230 is secured to the top surface by the bolts 250 when disposed in the corresponding fastener holes 66.

Similarly, as shown for example in FIG. 5B, each holder segment of the holder assembly 110 can be preassembled with selected seal components to form a holder subassembly unit 270 that includes a corresponding half or segment of the rotary seal ring 20 and the O-ring 188. A holder spacer element 126 is disposed in the holder space 111. The spacer element 126 assists with initially axially positioning selected seal components, such as for example the O-ring 188 and for example the rotary seal ring 20, in a selected axial position so as to prevent accidental damage to the components. The holder spacer element is removed prior to the holder assembly being mounted about the shaft 12. The O-ring 188 is disposed in the detent groove 92 formed in the outer surface 184 of the rotary seal ring 20. When the O-ring 188 and the rotary seal ring segment are disposed within the gland assembly 40, the O-ring 188 is positioned to seat within the detent groove 189 formed in the inner surface 124 of the holder assembly 120. The detent grooves 92, 189 serve to capture and hold the O-ring 188 without overly loading the O-ring in an axial or radial direction. The gland and holder subassembly units 260, 270 can include other sealing elements as well, including for example, the holder gasket 160, the gland gaskets 60 and 76, and other O-rings and sealing elements, such as the O-ring 142. The sealing elements are also split so as to fit in the subassembly units.

When assembling together the holder and gland subassembly units, the sealing elements, such as for example the O-rings 188, 202, can become pinched when the O-rings are moved from the unloaded position to the loaded position. For example, as the O-rings are compressed radially, they expand circumferentially with the ends of the O-ring segments protruding, potentially buckling when joined, thereby causing pinching by metal or seal face parts at the location of the split. In order to prevent this from occurring, the present invention provides for a selected assemblage of components that forms a loading assembly that does not prematurely load the O-rings 188, 202 prior to assembly of the subassembly units about the shaft 12, thus preventing the O-rings 188, 202 from extruding past the end faces of the holder and gland segments.

With regard to the holder subassembly units 270, each of the O-ring segments 188 are concentrically disposed about the rotary seal ring segments 20 and are preferably disposed in contact with the rotary seal ring outer surfaces 182, 184 and the rotary seal ring detent groove 92 to form the rotary seal ring pre-assembly. The O-ring 188 and the rotary seal ring 20 are mounted in the holder assembly 110 such that the O-ring 188 seats within the detent grooves 189, 92 formed in the surfaces 124, 184. This prevents, reduces or minimizes premature and unwanted loading of the O-ring 188 when the holder subassembly units 270 are assembled together. As such, the end regions of the O-ring segments do not extrude past the end faces of the holder and gland segments. The holder pre-assembly units 270, 270 are then disposed about the shaft 12. A coupling mechanism, such as a drive flat, can be employed to rotationally couple the rotary seal ring 20 to the holder assembly 110 for relative rotation therewith. The coupling mechanism can be disposed on either the holder assembly or the rotary seal ring, and in a preferred embodiment, is disposed on both the rotary and stationary seal rings. The detent groove 189 of the holder assembly 110 and the detent groove 92 of the rotary seal ring 20 receive and retain the O-ring 188 in an optimal position. The O-ring 188 provides an inward radial force sufficient to place the axial seal faces 25 of the rotary seal ring segments in sealing contact with each other. The holder segments are then secured together by tightening the screws 170 that are positively maintained in the fastener-receiving apertures 164. The rotary seal ring segments are spaced from the inner surface 124 of the holder assembly and are non-rigidly supported therein by the O-ring 188, thereby permitting small radial and axial floating movements of the rotary seal ring 20. When disposed within the detent grooves, the O-ring 188 is disposed in the unloaded position.

With regard to the gland pre-assembly unit 260, the O-ring 202 is disposed about the stationary seal ring 30 and then disposed adjacent the lead-in surface 52 formed along the inner surface of the gland assembly 40. The springs 86 are mounted within the corresponding spring holes 64 formed in the top surface 62 of the gland assembly 40. The spring holder plate 230 is secured to the gland assembly top surface 62 by partially tightening the bolts 250 in the fastener holes 66. The spring holder plate 230, the springs 86 and the bolts 250 can form the loading assembly. The multiple biasing inner clips 216 are mounted along the perimeter or circumferential edge of the top surface 61 of the gland assembly. The ridge portion 220 of the first end of the inner spring clip 216 is mounted in the recessed portion 242 formed in the bottom surface 238 of the spring holder plate 230. The outer spring clip 218 when mounted on the inner spring clip 216 has the bent tab portion 228 that has an edge or tip that seats in the groove 33 formed in the inner surface 32 of the stationary seal ring 30. The O-ring 202 is captured between the lead-in surface 52 (FIG. 3B) and the outer surface 190 of the stationary seal ring 30.

Figure 2A:
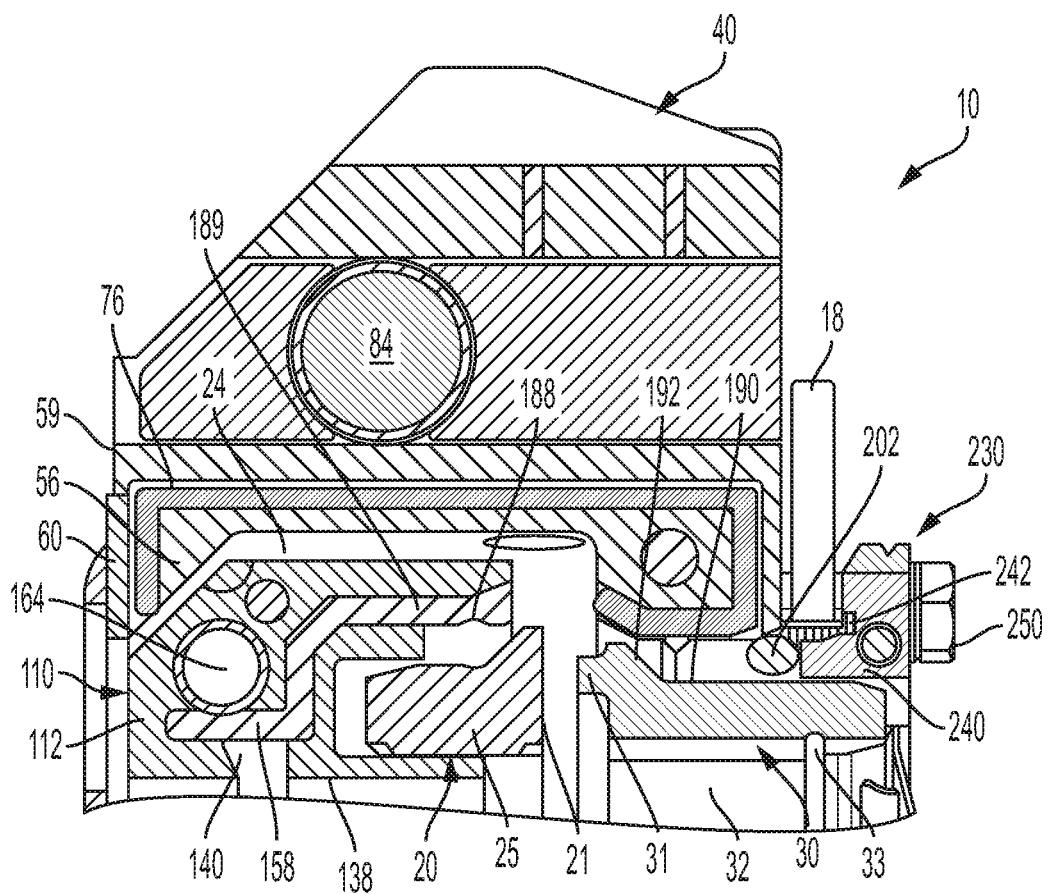
FIG. 2A is a partial cross-sectional view of the mechanical seal showing the sealing rings and sealing elements in a disengaged unloaded position according to the teachings of the present invention.
Figure 2B:
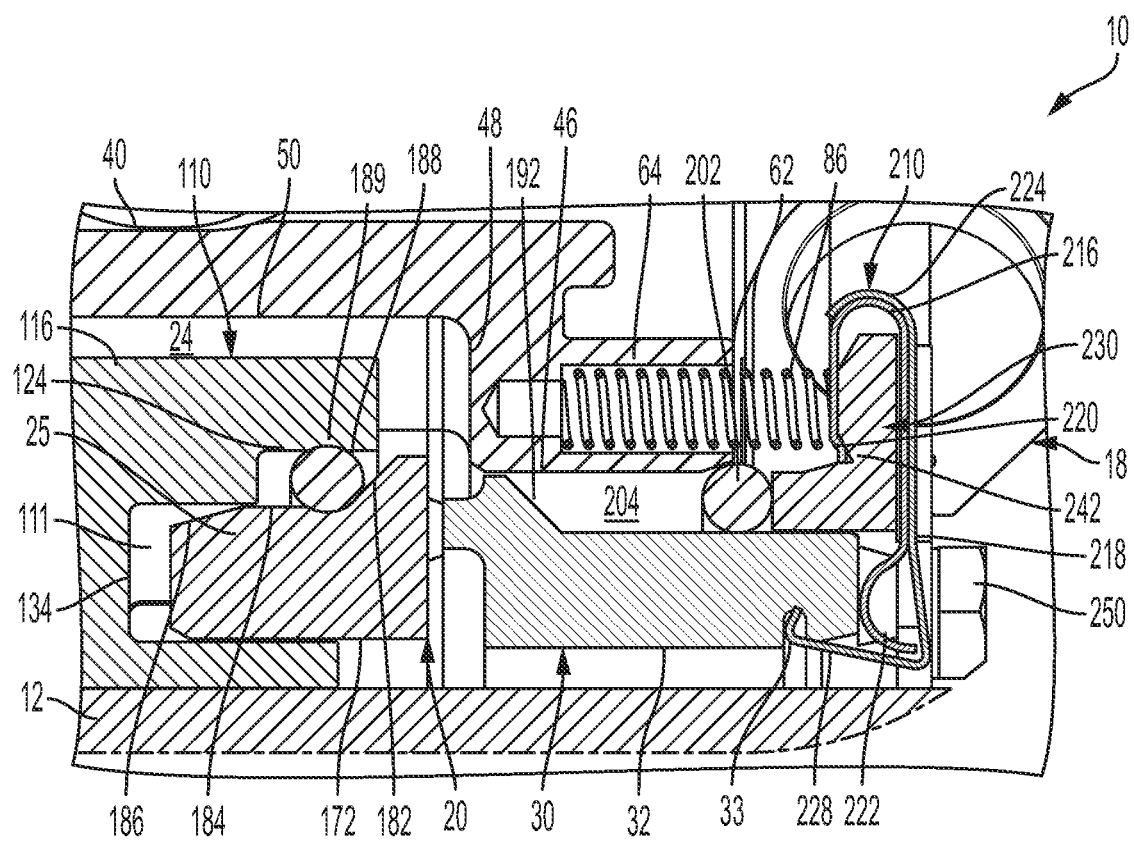
FIG. 2B is a partial cross-sectional view of the mechanical seal showing the sealing elements associated with the sealing rings in a disengaged unloaded position according to the teachings of the present invention.

As shown in FIGS. 2A and 2B, the gland subassembly unit 260 disposes the O-ring 202 into a disengaged and unloaded position and the holder subassembly unit 270 disposes the O-ring 188 in the detent grooves 188, 92, thus also placing the O-ring 188 in the disengaged, unloaded position. As such, the O-rings 188, 202 do not extrude past the seal faces of the holder and gland segments. Once fully assembled, the operator can move the O-rings 188 and 202 into an engaged and loaded position by axially moving the spring holder plate 230 in an inboard direction, as shown in FIGS. 3A and 3B. For example, the operator can selectively tighten the bolts 250 with a suitable tool, such as a wrench. When tightened, the bolts 250 serve to move the spring holder plate 230 in the axial inboard direction against the bias of the springs 86. The bottom surface of the flange portion 240 contacts the O-ring 202 and pushes the O-ring 202 in the axial inboard direction past the angled lead-in surface 52 and into the space 204. The O-ring 202 is hence squeezed (e.g., loaded) into the region 204 by radial compression and the O-ring is disposed in sealing contact with the outer surface 190 of the stationary seal ring 30 and the inner face or surface 46 of the gland assembly 40. The O-ring 202 is thus placed in the engaged and loaded position. Further, since the stationary seal ring 30 is coupled to the spring holder plate 230 by the biasing clip assembly 210, the movement of the spring holder plate 230 in the axial direction serves to push or move the stationary seal ring 30 in the axial inboard direction. The stationary seal ring 30 contacts the rotary seal ring 20 via the seal faces 21, 31, and hence pushes the rotary seal ring 20 in the axial inboard direction. The axial movement of the rotary seal ring 20 pushes the O-ring 188 out of the detent groove 189 formed in the inner surface 124 of the holder assembly 110. When moved out of the detent groove 189, the O-ring is squeezed (e.g., loaded) between the inner surface 124 of the holder assembly 110 and the detent groove 92 of the outer surface 184 of the rotary seal ring 20. The O-ring 188 thus seats within the detent groove 92 when in the loaded and unloaded positions. The detent grooves 189 and 92 preferably have a curved cross-section and are discrete grooves that are sized and configured for seating the O-ring 188.

The illustrated loading assembly can thus be employed to axially move the O-rings 202, 188 into the engaged and loaded position where they are radially compressed. The O-rings are compressed after the gland and holder subassembly units have been assembled and secured around the shaft 12 and to the stationary equipment. The loading assembly of the present invention avoids having the O-rings extrude past the end faces prior to assembly where they can be pinched when the subassembly units are secured together. Since the gland and holder surfaces defining the regions mounting the O-rings 202, 188 are in contact with each other prior to the O-ring being radially compressed in the sealing location, there is no protruding end of the O-ring segments with the potential resulting misalignment of the sealing elements.

The spring holder plate 230 further includes segments 231, 233 that are secured together using male and female types mechanical connections. The spring holder plate 230, prior to being tightened by the operator, serves to hold the rotary and stationary O-rings 188, 202 in a free state or unloaded position during the securing of the gland and holder subassembly units 260, 270 around the shaft 12. The preassembled subassembly units 260, 270 allow for sequenced installation of the units. Specifically, the holder subassembly units 270 (e.g., rotary subassembly units) are secured to the shaft 12 and then the gland subassembly units 260 (e.g., stationary subassembly units) are secured around the rotary components and to the stationary equipment. The axial movement of the spring holder plate 230 via the bolts 250 pushes the seal faces 21, 31 and the rotary and stationary O-rings 188, 202 into their operating locations. As such, a single element can be used to displace the O-rings 188, 202 from a radially uncompressed state (e.g., unloaded position) to a compressed energized state (e.g., loaded position).

Another embodiment of the mechanical seal assembly of the present invention is shown for example in FIGS. 7-14. Like reference numerals indicate like or similar parts throughout the various views. The mechanical seal assembly 300 forms a no-flush or zero-flush mechanical seal assembly since it is not necessary to introduce an external fluid, such as a flushing or barrier fluid, into the interior of the seal in order to flush particulates from the seal faces of the seal rings. More specifically, the illustrated mechanical seal assembly 300 of the present invention is directed to a split mechanical seal assembly that employs a gland assembly having a gland chamber formed in an inner surface that is sized and configured for seating one or more fluid insert elements or components. The fluid insert component, when mounted within the gland chamber, creates an expanded fluid volume of space that promotes circulation of the slurry process fluid by the rotating elements of the seal. The illustrated mechanical seal assembly 300 is preferably concentrically disposed about a shaft 12 and can be secured to an external wall of stationary equipment by fasteners, such as bolts, that seat between the illustrated bolt tabs 14 or gland land areas 370. The mechanical seal assembly 300 constructed in accordance with the teachings of the present invention provides a fluid-tight seal, thereby preventing a slurry process fluid from escaping the stationary equipment. The fluid-tight seal is achieved by a pair of sealing members, illustrated as a rotary seal ring 320 and a stationary seal ring 330, that form a seal therebetween. Each of the seal rings 20 and 30 has a pair of arcuate seal ring halves or segments and has a smooth arcuate sealing face or surface 324 and 334, respectively. The seal ring segments can be identical or substantially similar to the other. The smooth arcuate sealing surface 324, 334 of each seal ring is biased into sealing contact with the corresponding sealing surface of the other seal ring by the biasing clip assembly 210 to form a sealing interface. The sealing surfaces 324 and 334 of the seal rings provide a fluid-tight seal operable under a wide range of operating conditions, including a vacuum condition. The sealing surfaces 324 and 334 of each seal ring are preferably the same size and shape so as to form a line-to-line seal face or interface. Specifically, with reference to the seal surface 334 of the stationary seal ring, the illustrated seal surface 334 has a terminal end surface forming a planar surface in a single plane. The sealing surface 334 extends from the inner surface 332 of the terminal end to the outer surface of the terminal end. The sealing surface 324 of the stationary seal ring 320 is formed in a similar manner. As such, the sealing surfaces 324, 334 have the same size and shape, fully overlap, and are aligned so as to form the fluid-tight seal. The rotary seal ring 320 is mounted within a holder chamber of a holder assembly 380, which is in turn mounted within a gland mounting region of a gland assembly 340. The stationary seal ring 330 is also mounted within the gland mounting region.

The stationary seal ring 330 can have a substantially smooth arcuate inner surface 332 extending parallel to a longitudinal axis of the shaft 12 and an opposed outer surface. The inner surface 332 has formed along the inner wall a circumferentially extending recess or groove 333 that is sized and configured for receiving a retaining portion of a biasing clip assembly 210, described in further detail below, for mounting and retaining the stationary seal ring 330 to a spring holding plate 230. The groove 333 can be continuous or non-continuous. If non-continuous, the groove 333 can be formed as a series of recesses that are spaced apart along the inner surface 332.

The inner diameter of the stationary seal ring 330 as defined by the inner surface 332 is greater than the shaft diameter, thereby allowing relative motion therebetween. Therefore, the stationary seal ring 330 remains stationary while the shaft rotates. An elastomeric sealing member, e.g., O-ring 202, provides a radially inward biasing force sufficient to place the axial sealing faces of the seal ring segments in sealing contact with the other stationary seal ring segment. Additionally, the O-ring 202 forms a fluid-tight and pressure-tight seal between the inner surface 374 of the gland assembly 340 and the stationary seal ring 330. The stationary seal ring 330 is preferably composed of a carbon or ceramic material, such as alumina or silicon carbide and the like.

The illustrated gland assembly 340 has a main body 342 that is coupled to the stationary equipment through known fastening mechanisms and techniques. As shown for example in FIGS. 1, 7-9, and 12, the gland assembly 340 can employ bolt tabs 18 that can be circumferentially arranged about the gland main body in order to accommodate fasteners, such as bolts. In the current embodiment, the gland main body 342 includes fastener channels 372 that are formed in gland land areas 370. According to one embodiment, the fastener channels 370 help define the land areas 370 and the fastener housings 80, 82 of the gland assembly 340. The fastener channels 372 are sized and configured to accommodate a fastener for securing the gland assembly 340 to the stationary equipment. The main body 342 of the gland assembly has an inner surface 374 and an outer surface 376 that includes a radially outer first annular portion 344 and a radially inwardly stepped second annular portion 346. The inner surface 376 of the gland assembly has one or more gland chambers 360 formed therein. The gland chamber 360 can be formed so as to extend along the entire usable circumference of the inner surface 374 of the main body 342 or can be formed into separate discrete gland chambers 360 therein, each of which extends along only a portion of the circumference of the inner surface 374. According to one embodiment, multiple gland chambers 360 can be formed in the inner surface 374 and, in total, can extend along an arc portion of the inner circumference defined by the inner surface 374 measuring between about 65 degrees and about 90 degrees of the inner circumferential surface, and preferably extends between about 75 degrees and about 80 degrees of the inner circumferential surface. The gland chamber 360 has a floor portion 362 and a set of walls 364 that define the gland chamber 360. The inner surface 374 of the gland assembly 340 and the stationary equipment forms a space 308 (e.g., gland mounting region) that seats the other components of the mechanical seal assembly and which is sized to accommodate the slurry process fluid. The floor 362 of the gland chamber 360 can have a shape and configuration that is complementary to the shape of the top surface of the fluid insert element 400, 430.

The main body 342 of the gland assembly 340 can have multiple optional radially extending ports formed therein. According to one embodiment, the main body 342 has a barrier or flushing fluid port 352 formed in the first annular portion 344. The flushing fluid port 352 extends from the outer surface 376 of the main body to the floor portion 362 of the gland chamber 360. The flushing fluid port 352 can be configured to connect to a fluid conduit, such as an external piping system, for introducing a flushing fluid, such as water, into the inner space 308 of the mechanical seal assembly 300. The flushing fluid can typically be used to flush or move particulates that are present in the slurry process fluid away from the seal faces 324, 334. The gland assembly 340 can also optionally include a clean-in-place (CIP) fluid port 354 for allowing access by a user to the inner space 308 of the mechanical seal assembly 300. According to one embodiment, the CIP fluid port 354 is formed in the stepped annular portion 346 of the gland main body 342. The CIP fluid port 354 extends from the outer surface 376 of the gland assembly 340 to the inner surface 374. The CIP fluid port 354 is thus disposed in direct fluid communication with the inner space 308. The CIP fluid port can be configured to be coupled to a fluid conduit, such as a piping system, to introduce a clean out fluid, such as water, to the inner space 308. The clean out fluid can be used to clean out the space 308 of the particulates in the process fluid by moving the particulates away from the seal interface. The gland assembly 340 can also include an optional mechanical port 348 that is formed in the first annular portion and which also extends from the outer surface 376 of the gland assembly to the inner surface or floor portion 362 of the gland chamber 360. The mechanical port 348 can be sized and configured for seating a fastener 350 that can be used to secure a fluid insert element 400, 430 in the gland chamber 360.

The illustrated mechanical seal assembly 300 can also include a holder assembly 380 that defines a space for receiving and retaining the rotary seal ring 320. The holder assembly 380 can be split to facilitate easy assembly and installation. In one embodiment, the holder assembly 380 comprises a pair of arcuate holder segments that mate together to form the annular holder assembly 380. The holder assembly 380, or each arcuate holder segment if the holder assembly is split, has a main body having a radially outer surface 382 facing the gland assembly 340 and a first generally radially inner surface 384 (in addition to the radial innermost surface 386) for sealing against the rotary seal ring 320 and defining the space for receiving and retaining the rotary seal ring 320.

A sealing element, such as O-ring 188, is concentrically disposed about the rotary seal ring 20 to seal between the rotary seal ring 20 and the holder assembly 110. As shown, the O-ring 188 is preferably disposed about a radially outer surface of an axially inner portion of the rotary seal ring 320 and seals against the radially inner surface 384 of the holder assembly 380. The radially inner surface 384 of the holder assembly 380 may optionally include a detent groove 189 for receiving and seating the O-ring 188 disposed about the rotary seal ring 320 to facilitate assembly and operation of the mechanical seal and to maintain the rotary seal ring 320 in an optimal position.

Other sealing members can be provided to seal the interfaces between different components of the mechanical seal assembly 300. For example, a flat annular elastomeric gasket 60 can be employed to seal the interface between the gland assembly 340 and the stationary equipment. Further, a holder gasket 160 can be mounted in a corresponding groove to seal the holder segments together if the holder assembly 380 is split. A holder/shaft elastomeric member, illustrated as O-ring 142, sits in a holder groove formed along the innermost surface 386 and seals between the holder assembly 380 and the shaft 12. A stationary seal ring/gland elastomeric member, illustrated as O-ring 202, seals at an interface between the stationary seal ring 330 and the gland assembly 340 and provides radially inward pressure on the stationary seal ring 330. A gland gasket 76 can seat within a gland gasket groove 70 (FIG. 9) so as to form a seal between the gland halves when assembled together. One skilled in the art will recognize that the mechanical seal assembly 300 may have any suitable means for sealing between different components.

In addition, the illustrated split mechanical seal 300 can include an anti-rotation mechanism (not shown) such as a pin or a flat surfaced element that extends axially between the rotary seal ring 320 and the holder assembly 380 to prevent relative rotary movement between the rotary seal ring 330 and the holder assembly 380. Those of ordinary skill will also recognize that suitable fasteners, such as bolts, can be employed to secure together the gland halves and the holder halves. Certain components of the mechanical seal 300 of the present invention are similar to the mechanical seal assemblies described in U.S. Pat. Nos. 5,571,268, 7,708,283 and 10,352,457, the contents of which are herein incorporated by reference.

According to one embodiment, one or more of the illustrated seal rings 320, 330, the holder assembly 380, and the gland assembly 340 can include a detent groove similar to the detent grooves previously described in connection with the mechanical seal assembly 10. The detent grooves operate and function in the same or similar manner.

In the mechanical seal assembly 300 of the present invention, an axial outboard biasing clip assembly 210 can be employed to generate and apply an axially inwardly extending biasing force to the stationary seal ring 330, thus placing the seal faces 324, 334 of the rotary and stationary seal rings in sealing contact with each other. The illustrated biasing clip assembly 210 also functions as an axial biasing mechanism by providing resilient support for the stationary and rotary seal rings 320, 330 by axially biasing the seal rings together, such that the stationary and rotary sealing surfaces 334 and 324 are disposed in sealing contact with each other to form the sealing interface. The seal rings 320, 330 are floatingly and non-rigidly supported in spaced floating relation relative to the rigid walls and faces of the gland assembly 340 and the holder assembly 380. This floating and non-rigid support and spaced relationship permits radial and axial floating movements of the rotary seal segments and the stationary seal segments with respect to the shaft 12, while still allowing the rotary sealing surface 324 to follow and to be placed in sealing contact with the smooth arcuate sealing surface 334 of the stationary seal ring 330. Thus, the rotary and stationary seal ring sealing surfaces are self-aligning as a result of this floating action.

The mechanical seal assembly 300 of the present invention can employ a series of biasing clip assemblies 210 that are mounted on the axially outermost end of the gland assembly 340. Since the biasing clip assemblies 210 are identical, only one clip assembly is described herein. The biasing clip assembly 210 can employ an inner generally C-shaped spring clip, defined as an inner spring clip 216, and an outer spring clip 390. The inner spring clip 216 has a first lower end 220 that is configured to seat between the spring holder plate 230 and the top or outer surface of the gland assembly 340 when coupled together to secure the inner spring clip 216 therebetween. According to one embodiment, the end surface of the stationary seal ring 330 can be relatively flat. According to another embodiment, the end surface of the stationary seal ring 330 can be flat and annular or the end surface can have recessed portions formed therein, such as the recessed portions 196. Although the inner spring clip is described as seating within the recess, the present invention also contemplates that the inner spring clip seats against the flat end surface. Specifically, the inner spring clip 216 can include a bent portion 222 that seats on or can be disposed in contact with the top surface of the stationary seal ring 330 to provide an axial biasing force thereto. The bent portion 222 thus functions as an axial biasing member for applying an axial biasing force to the seal rings 320, 330. The axial biasing force as is known to those of ordinary skill in the art is an inboard directed force that helps place the seal faces 324, 334 of the seal rings 320, 330, respectively, in sealing contact with each other.

The illustrated mechanical seal assembly 300 also includes an axially movable spring holder plate 230. The illustrated spring holder plate 230 can be formed from a pair of plate segments that can be connected together. The spring holder plate 230 has an annular main body having a top surface 232 that can optionally include a plurality of cut-outs or recesses 234 formed therein that are circumferentially spaced apart along the circumference of the main body. The top surface 232 also has formed therein a series of fastener-receiving apertures 236 for receiving fasteners, such as for example the bolts 250. The spring holder plate 230 also includes a bottom surface 238 having a recessed portion 242 formed adjacent an axially extending flange portion 240. The recesses 234 and the recessed portion 242 are configured for seating a portion of the biasing clip assembly 210, such as selected portions of the inner spring clip 216. The spring holder plate segments have end faces 244 that are configured for mating with the end faces of the other spring holder plate segment. The spring holder plate 230 is sized and dimensioned such that the flange portion 240 seats between the inner surface 374 of the gland assembly 340 and the outer surface of the stationary seal ring 330. The spring holder plate 230 when tightened by the bolts 250 compresses the plate 230 and engages with the O-ring 202. The O-ring 202 is pushed by the flange portion past the lead-in surface of the gland assembly 340 and into the mounting region 204. Simultaneously, the stationary seal ring 330 is axially pressed towards the rotary seal ring 20 by the biasing clip assembly 210.

The biasing clip assembly 210 of the mechanical seal 10 of the present invention also includes an outer spring clip 390 that is adapted to be operatively coupled to the inner spring clip 216 and which functions as a retaining portion. Specifically, outer spring clip 390 has a main body that includes a generally rounded or coiled first end portion 392 that is configured to be mounted within and engage the bent portion 222 of the inner spring 216. The engagement of the coiled portion 392 and the bent portion 222 serves to retain and seat the outer spring clip 390. The main body of the outer spring clip 390 also includes a bent tab portion 394 that is disposed opposite the coiled portion 392. The bent tab portion 394 is configured to overlie the terminal end region of the stationary seal ring 330 and to engage and seat within the groove 333 formed in the inner surface 332 thereof. The bent tab portion 394 of the outer spring clip 390 retains or mounts the stationary seal ring 330 to the gland assembly 340 by engaging with the recess 333. By retaining or mounting the stationary seal ring 330 to the gland assembly 340, the components of the mechanical seal assembly 300 can be pre-assembled, which helps facilitate easy installation of the split mechanical seal assembly 300. Those of ordinary skill in the art will readily recognize that the inner and outer spring clips 216, 390 can have any suitable shape or configuration provided that the clips can engage with the spring plate holder 230 and the stationary seal ring 330 so as to apply an axial biasing force to the stationary seal ring and to the spring plate holder.

With reference to FIGS. 7-11, the mechanical seal assembly 300 includes the fluid insert element 400 that is sized and configured to seat within the gland chamber 360 that is formed in the inner surface 374 of the gland assembly 340. The fluid insert element 400 can have any selected size, shape or configuration. When seated within the gland chamber 360, the fluid insert element 400 has an exposed surface that faces and is exposed to the slurry process fluid in the space 308. The exposed surface of the fluid insert element 400 can have any selected shape, and preferably has a non-planar shape that includes one or more curved, sloped or stepped surface features formed therein that are sufficient for promoting movement of the process fluid and any particulates contained therein back towards the stationary equipment and away from the seal interface formed by the seal faces 324, 334. According to one embodiment, the illustrated fluid insert element 400 has a main body 402 that has a top surface 404 and a series of side walls or surfaces 406. The main body 402 also has a bottom surface 408 that forms the exposed surface that interfaces with or is exposed to the slurry process fluid. The top surface 404 of the main body can have any selected shape or configuration, and according to one embodiment, includes a stepped tower portion 410. The stepped tower portion 410 can include a top portion 412 and connected side walls 414. The side walls 414 can be solid and hence closed or one more of the side walls 414 can have a fluid opening 416 formed therein. The fluid opening 416 can have any selected shape or configuration. The top portion 412 of the tower portion 410 can also include an opening 418 that can be aligned with the flushing fluid port 352. Likewise, the main body portion can also include a fluid opening 420 formed in the top surface 404 that is aligned with the opening 418 and the fluid port 352. Further, the top surface 404 can have an opening 422 that is aligned with the mechanical port 348 for seating and retaining a portion of the fastener 350. The adjacent side wall 406B can have a side opening 424 formed therein. In order to make the fluid insert element 400 reversible in nature, the opening 422 can also be formed in the opposed ends of the top surface 404 and the opposed side wall 406A can also have the side opening 424 formed therein. The illustrated bottom surface 408 can be shaped in any selected manner. According to one embodiment, the bottom surface 408 has a curved shape that curves or extends in a lateral direction between the side walls 406A and 406B. According to another embodiment, the bottom surface 408 can have a curved shape that extends in a medial (e.g., front-back) direction between the side walls 406C and 406D. According to yet another embodiment, the bottom surface 408 can be curved in both the lateral and medial directions.

According to another embodiment, the fluid insert element can have a different shape and configuration for enhancing or promoting the movement of particulates in the slurry process fluid away from the seal faces of the seal rings 320, 330. As shown for example in FIGS. 12-14, the illustrated fluid insert element 430 has a main body 432 that has a top surface 434 and a series of side walls or surface 436. The main body 432 also has a bottom surface 438 that forms the exposed surface that interfaces with or is exposed to the slurry process fluid. The top surface 434 can have any selected shape or configuration, and according to one embodiment, includes a stepped tower portion 440. The stepped tower portion 440 can include a top portion 442 and connected side walls 444. The side walls 444 can be solid and hence closed or one more of the side walls 444 can have a fluid opening 446 formed therein. The fluid opening 446 can have any selected size, shape or configuration. The top portion 442 can also include an opening that can be aligned with the flushing fluid port 352. Likewise, the main body portion can include a fluid opening 450 formed in the top surface 434 that is aligned with the opening in the tower portion and the fluid port 352. Further, the top surface 434 of the main body 432 can have an opening 452 formed therein that is aligned with the mechanical port 348 for seating and retaining a portion of the fastener 350. The adjacent side wall can have a side opening formed therein. As shown for example in the illustrated embodiment, the side walls 436A and 436B can each have the opening 454 formed therein. In order to make the fluid insert element 430 reversible in nature, the opening 452 can also be formed in the opposed ends of the top surface 434 and the opposed side walls 436A and 436B can also have the side opening 454 formed therein. The illustrated bottom surface 438 can be shaped in any selected manner. According to one embodiment, the bottom surface 438 has a multi-contoured shape that includes both curved and sloped regions. For example, the bottom surface 438 can be sloped in the medial direction (e.g., between side walls 436C and 436D). The sloped surface can include sloped opposed end portions 462 and an intermediate sloped portion 464. The sloped end portions 462 can be sloped at angles that are less than or shallower than the slope angle of the intermediate sloped region 464. Th bottom surface 438 also includes a curved region 468 that extends laterally between the side walls 436A and 436B.

When assembled, the fluid insert element 400, 430 can be inserted into the gland chamber 360 and the fluid openings are aligned with the mechanical port 348 and the flushing fluid port 352. The space 308 formed between the outer surfaces of the seal rings 320, 330 and the inner surface 374 of the gland assembly and the bottom surface of the fluid insert component forms an annular chamber or space 308 that houses the slurry process fluid. The slurry process fluid to be sealed is housed and flows within this space 308. The movement of the rotary components of the mechanical seal assembly 300, such as the holder assembly 380 and the rotary seal ring 330, forms turbulence within the slurry process fluid, which in turn promotes movement of the process fluid within the space 308. It is during this movement that the particles in the slurry process fluid build up at the seal interface. According to the another embodiment, the holder assembly 380 can have one or more surface features formed on the outer surface in the form of pumping vanes to further promote movement of the slurry process fluid. The particulates present within the slurry process fluid can accumulate during use at the seal faces 324, 334 of the seal rings 320, 330, which over time can damage the seal faces. In an effort to promote movement of the particulates away from the seal faces 324 and 334 and to protect the seal components, the gland chamber 360 seats the fluid insert component that has a specially configured bottom surface that promotes movement of the particulates away from the seal faces by altering the flow dynamics within the space 308. Specifically, the gland chamber 360 can have a depth or height that is sufficient to accommodate the fluid insert element, while also increasing the space formed between the bottom surface of the fluid insert element and the outer surface of the holder assembly 380. This arrangement of components provides or forms a larger flow area or volume within the space 308. The substantially increased space or volume allows the fluid insert element to move the particles away from the seal interface, thereby preventing particle build-up and impaction on the seal faces 324 and 334. The combination of the gland chamber 360 and the fluid insert elements 400, 430 provides larger flow area volumes within the seal, thus eliminating the potential impact of contaminant particles on the seal faces. As the slurry is pumped or moved during use, the bottom surface of the fluid insert element promotes movement of the particulates away from the seal faces. More specifically, the shape of the bottom surface 408, 438 promotes movement of the particulates away from the seal faces, as shown by the arrow 470 in FIGS. 8 and 12. The arrows 470 are indicative of the ejection path and associated trajectories of the fluid particles.

The advantages of employing the fluid insert element are numerous. The fluid insert element 400, 430 helps provide for additional circulation of the slurry process fluid around the seal faces. The fluid insert element also helps increase the dissipation of frictional heat that can be generated at the seal faces. Further, the motion of the slurry process fluid created by the fluid insert element during use helps prevent the stationary O-rings from becoming clogged with the particulate matter. Still further, since fluid flow is induced by the rotating parts of the mechanical seal assembly and the fluid insert element promotes movement of the particles away from the seal faces, there is no need to provide or employ an external flushing fluid. As such, there is no need to provide any associated fluid supplying structure or power needed for flushing the mechanical seal assembly 300. Additional surface features can be added to selected rotating components (e.g. the outside diameter of dynamic/rotating seal face) to increase fluid flow velocity. Another advantage of the mechanical seal assembly 300 of the present invention is that the seal can be configured to use the available space 308 in the gland assembly to form the gland chamber 360 so as to optimize fluid flow and the flow characteristics of the slurry process fluid.

By way of a simple example, in a conventional 3.5 inch mechanical seal, the normal chamber area between the inner surface of the gland or housing and holder assembly can be about 8.50 cubic inches. According to the present invention, the combination of the gland chamber 360 and the seated fluid insert element 400, 430, as shown and described herein, can increase the volume area to about 10.8 cubic inches. As such, the mechanical seal assembly 300 of the present invention employs a fluid insert element that adds between about 15% and about 30% additional volume in the space 308.

The illustrated fluid insert elements 400, 430 have a selected configuration for forming multiple different flow paths, including a return flow path for particulates in the slurry process fluid. The geometry of the fluid insert elements provides a pressure differential due to the flow regime around the rotating shaft 12. The pressure difference causes fluid flow that imparts movement on the slurry particles. The geometry of the bottom surface of the fluid insert elements 400, 430 also causes ejection of the particles away from the seal face area and imparts momentum on the particles so that they can be ejected away from seal faces back to the process fluid reservoir (e.g., within the stationary equipment). The present configuration of the fluid insert element also eliminates (i.e. flush-less or zero-flush system) or reduces flush flow rate requirements. One of ordinary skill in the art will readily recognize that the fluid insert element can have any selected shape or configuration provided that the bottom surface of the element is configured to impart flow to the process fluid and to promote movement of the particulates away from the seal faces.

The fluid insert element 400, 430 can be formed by employing conventional additive manufacturing techniques. Further, forming the component as a separate component eliminates the need to machine complex patterns and shapes into the inner surface of the gland assembly. The fluid insert element 400, 430 can also impart fluid flow independent of direction of rotation of the shaft (e.g., bi-directional operation). Further, the symmetrical configuration of the fluid insert element allows for bi-directional operation.

The fluid insert element can be formed from any suitable material, including for example polyurethane, plastic, rubber, EPDM, H-NBR, and the like. The material can be selected so as to provide improved wear characteristics relative to conventional metal materials (i.e. current erosion of stainless steel glands).

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

We claim:

1. A mechanical seal assembly for mounting to stationary equipment having a rotating shaft and for housing a slurry process fluid, comprising
   a gland assembly configured for mounting to the stationary equipment and forming a gland mounting region, wherein the gland assembly has a main body that includes an outer surface and an inner surface, wherein the inner surface has at least one gland chamber formed therein, wherein the main body of the gland assembly has a first fluid port formed therein,
   a fluid insert element sized and configured for mounting in the gland chamber, wherein the fluid insert element has a main body having a top surface having a fluid opening formed therein, an opposed non-planar bottom surface configured for being exposed to the slurry process fluid in the gland mounting region, and a plurality of side walls coupled to the top surface, wherein at least one for the sidewalls has a side wall opening formed therein, and wherein the fluid opening is in fluid communication with the first fluid port and with the non-planar bottom surface,
   a holder assembly forming a holder chamber and disposed within the gland mounting region,
   a rotary seal ring disposed within the holder chamber of the holder assembly and having a main body having a rotor sealing surface formed at one end, and
   a stationary seal ring disposed within the gland mounting region and having a main body having a stator sealing surface formed at one end, wherein the stator sealing surface and the rotor sealing surface are disposed adjacent to each other to form a sealing interface.

2. The mechanical seal assembly of claim 1, wherein the stator sealing surface and the rotor sealing surface have the same size and shape.

3. The mechanical seal assembly of claim 2, wherein the first fluid port is formed in a first annular portion of the gland assembly and the first fluid port extends between the inner surface and the outer surface of the gland assembly, and wherein the first fluid port is positioned so as to be in fluid communication with the gland chamber.

4. The mechanical seal assembly of claim 3, wherein the main body of the gland assembly has a second annular portion having a second fluid port formed therein that extends between the inner surface and the outer surface of the gland assembly for introducing a fluid into the gland mounting region.

5. The mechanical seal assembly of claim 4, wherein the first annular portion has a third fluid port formed therein that extends between the inner surface and the outer surface of the gland assembly, wherein the third fluid port is positioned so as to be in fluid communication with the gland chamber.

6. The mechanical seal assembly of claim 4, wherein the bottom surface of the fluid insert element has a curved shape.

7. The mechanical seal assembly of claim 6, wherein the curved shape of the bottom surface of the fluid insert element is curved in a lateral direction.

8. The mechanical seal assembly of claim 7, wherein the curved shape of the bottom surface of the fluid insert element is curved in a medial direction.

9. The mechanical seal assembly of claim 6, wherein the bottom surface of the fluid insert element has a sloped surface.

10. The mechanical seal assembly of claim 9, wherein the bottom surface of the fluid insert element has a first sloped surface and an opposed second sloped surface that are each sloped at a first angle, and an intermediate sloped surface disposed between the first and second sloped surfaces that is sloped at a second angle, wherein the second angle is greater than the first angle.

11. The mechanical seal assembly of claim 3, wherein the main body of the fluid insert element includes a tower portion extending outwardly from the top surface, wherein the tower portion has a tower top surface and a plurality of tower side walls, wherein one or more of the plurality of tower side walls has the side wall opening formed therein.

12. The mechanical seal assembly of claim 11, wherein the tower top surface has the first fluid opening formed therein that is aligned with the first fluid port when the fluid insert element is mounted within the gland chamber, and wherein the top surface of the main body of the fluid insert element has a second fluid opening formed therein that is aligned with the first fluid opening.

13. The mechanical seal assembly of claim 4, further comprising
   a stator sealing element disposed about the outer surface of the stationary seal ring,
   an axially movable spring holder plate having a top surface and an opposed bottom surface and a radially inwardly spaced flange portion, wherein the top surface has a plurality of fastener apertures formed therein,
   a plurality of biasing clip assemblies configured for mounting about the spring holder plate and for mating engagement with the stationary seal ring for coupling the spring holder plate to the stationary seal ring, and
   a plurality of fasteners for mounting in the fastener apertures and the gland fastener holes and for securing the spring holder plate to the top surface of the gland assembly,
   wherein the gland assembly has a top surface having a plurality of gland fastener holes formed therein,
   wherein the stator sealing element is disposable in a radially uncompressed state when in a first unloaded position and wherein the spring holder plate is movable in the axial direction when the plurality of fasteners are tightened so as to move the stator sealing element in the axial direction into a radially compressed state when in a second loaded position.

14. The mechanical seal of claim 13, wherein the top surface of the gland assembly has a plurality of spring holes formed therein, further comprising a plurality of springs for mounting in the plurality of spring holes.

15. The mechanical seal of claim 13, wherein the holder assembly has an inner surface having a holder detent groove formed therein, and wherein the rotary seal ring has a rotary detent groove formed in the outer surface thereof.

16. The mechanical seal of claim 13, wherein the stationary seal ring has an inner surface having a groove formed therein for coupling to a portion of each of the plurality of biasing clip assemblies.

17. The mechanical seal of claim 16, wherein each of the plurality of biasing clip assemblies comprises
- an inner spring clip having a main body having
  - an inner ridge portion formed at a first end thereof and configured for engaging with a bottom surface of the spring holder plate, and
  - a bent portion formed at a second opposed end and configured for engaging with the top surface of the stationary seal ring, and
- an outer spring clip having a first coiled end sized and configured for seating in the bent portion of the inner spring clip and an opposed second end having a bent tab portion sized and configured for engaging with the groove formed in the inner surface of the stationary seal ring.

* * * * *